United States Patent [19]

Lokhandwala et al.

[11] Patent Number: 5,407,467
[45] Date of Patent: Apr. 18, 1995

[54] SOUR GAS TREATMENT PROCESS

[75] Inventors: Kaaeid A. Lokhandwala, Menlo Park; Richard W. Baker, Palo Alto; Karl D. Amo, San Carlos, all of Calif.

[73] Assignee: Membrane Technology and Research, Inc., Menlo Park, Calif.

[21] Appl. No.: 143,496

[22] Filed: Oct. 25, 1993

[51] Int. Cl.$^6$ .................... B01D 53/22; B01D 71/56
[52] U.S. Cl. .................................... 95/49; 95/51; 95/52
[58] Field of Search ................... 95/45, 49, 51, 52

[56] References Cited

U.S. PATENT DOCUMENTS

| | | | |
|---|---|---|---|
| 3,534,528 | 10/1970 | Porter | 55/16 |
| 4,130,403 | 12/1978 | Cooley et al. | 55/16 |
| 4,370,150 | 1/1983 | Fenstermaker | 55/16 |
| 4,374,657 | 2/1983 | Schendel et al. | 62/19 |
| 4,493,716 | 1/1985 | Swick | 55/158 |
| 4,561,864 | 12/1985 | Klass et al. | 55/16 |
| 4,589,896 | 5/1986 | Chen et al. | 62/28 |
| 4,597,777 | 7/1986 | Graham | 55/16 |
| 4,606,740 | 8/1986 | Kulprathipanja | 55/16 |
| 4,608,060 | 8/1986 | Kulprathipanja | 55/16 |
| 4,659,343 | 4/1987 | Kelly | 55/16 |
| 4,737,166 | 4/1988 | Matson | 55/16 |
| 4,781,733 | 1/1988 | Babcock et al. | 55/16 |
| 4,857,078 | 8/1989 | Walter | 55/16 |
| 4,963,165 | 10/1990 | Blume et al. | 55/16 |
| 5,096,592 | 3/1992 | Schucker | 210/654 |
| 5,169,412 | 12/1992 | Prasad et al. | 95/52 X |
| 5,205,842 | 4/1993 | Prasad | 95/52 X |
| 5,234,471 | 8/1993 | Weinberg | 95/52 X |

FOREIGN PATENT DOCUMENTS 1478083 6/1977 United Kingdom.

OTHER PUBLICATIONS

W. J. Schell et al. "Separation of Co2 from Mixtures by Membrane Permeation", Gas Cond. Conf. Univ of Oklahoma, Mar. 1983.

W. J. Schell et al., "Spiral-Wound Permeators for Purification and Recovery", Chem Eng. Progress, Oct. 1982, pp. 33-37.

N. N. Li et al., "Membrane Sparation Process in the Petrochemical Industry", Phase II Report Dept of Energy, Sep. 1987, pp. 1-12, 17-22.

E. W. Funk et al., "Effect of Impurities on Cellulose Acetate Membrane Performance", Recent Adv. in Separation Tech. AIChE Symposium Series, 250, vol. 82, 1986.

A. B. Coady et al., "CO2 Recovery by Gas Permeation", Chem Eng. Progress Oct. 1982, pp. 44-49.

F. G. Russell, "Applications of the DELSEP Membrane System", Chem Engineering Progress, Oct. 1984, pp. 48-52.

D. Parro, "Membrane CO2 Separation", Energy Progress, vol. 5, No. 1, Mar. 1985, pp. 51-54.

G. Cutler et al., "Large Scale CO2 Recovery with Membranes", Gas Cond. Conference, 1985.

T. E. Cooley et al., "Field Tests Show Membrane Processing Attractive" Chem. Engineering Progress, Oct. 1985, pp. 45-50.

G. Markiewicz, "Separex Membrane Systems: The Economical Solution to Gas Treating Problems", Gas Processor's Assoc Mtg. Jan. 1988.

(List continued on next page.)

Primary Examiner—Robert Spitzer
Attorney, Agent, or Firm—J. Farrant

[57] ABSTRACT

Improved membranes and improved membrane processes for treating gas streams containing hydrogen sulfide, carbon dioxide, water vapor and methane, particularly natural gas streams. The processes rely on the availability of two membrane types, one of which has a hydrogen sulfide/methane selectivity of at least about 40 when measured with multicomponent gas mixtures at high pressure. Based on the different permeation properties of the two membrane types, optimized separation processes can be designed.

103 Claims, 11 Drawing Sheets

OTHER PUBLICATIONS ing conditions, economic parameters and membrane properties" Journal Memb Sc., 81, 1993, pp. 239–252.

D. J. Stookey et al., "Natural Gas Processing with PRISM Separators", Environmental Progress, vol. 3, No. 3, Aug. 1984, pp. 212–214.

W. H. Mazur et al., "Membranes for Natural Gas Sweetening $CO_2$ Enrichment", Chem Eng. Progress, Oct. 1982, pp. 38–43.

M. D. Donahue et al., "Permeation behavior of carbon dioxide-methane Mixtures in cellulose acetate membranes", Journal Membrane Science No. 42, 1989 pp. 197–214.

A. Deschamps et al., "Development of Gaseous Permeation Membranes adapted to the Purification of Hydrocarbons", IIF-IIR Comm A3, Paris, 1989.

D. L. Ellig et al., "Concentration of Methane from Mixtures with Carbon Dioxide by Permeation through Ploymeric Films", Journal of Membrane Science, 8, 1980 pp. 259–263.

B. D. Bhide et al., "Membrane processes for the removal of acid gases from natural gas. Process configurations and optimization of operating conditions." Journal Memb. Science, 81, 1993 pp. 209–237.

B. D. Bhide et al., "Membrane processes for the removal of acid gases from natural gas. Effects of operat-

SOUR GAS TREATMENT PROCESS

FIELD OF THE INVENTION

The invention relates to processes for removing acid gases from gas streams. More particularly, the invention relates to a membrane process for removing hydrogen sulfide and carbon dioxide from gas streams, such as natural gas.

BACKGROUND OF THE INVENTION

Natural gas provides more than one-fifth of all the primary energy used in the United States. Much raw gas is "subquality", that is, it exceeds the pipeline specifications in nitrogen, carbon dioxide and/or hydrogen sulfide content. A representative range of U.S. gas compositions, compared to the specifications that must be met to bring the gas to pipeline quality, is shown in Table 1.

TABLE 1

Natural Gas Compositions Found in the U.S. and the Specifications of the Pipeline Grid

| Component | Typical pipeline spec. | Typical composition range |
|---|---|---|
| Hydrogen sulfide | <4 ppm | **76% < 4 ppm<br>11% 4–1,000 ppm<br>4% 1,000–10,000 ppm<br>8% > 10,000 ppm |
| Carbon dioxide | <1–3% | **72% < 1%<br>18% 1–3%<br>7% 3–10%<br>3% > 10% |
| Water | 80–140 ppm | 800–1,200 ppm |
| Inerts ($CO_2$, $N_2$, He, Ar, etc.) | <3–4% | — |
| Oxygen | <0.4% | — |

**Compositions for producing wells. Unexploited reserves contain higher fractions of subquality gas.

The best treatment for natural gas right now is no treatment. Currently, more than half of the gas produced in the U.S. can be brought to pipeline specification after minimal processing, such as glycol dehydration to remove water. Raw gas that is known to be high in nitrogen content, high in nitrogen plus carbon dioxide content, or high in hydrogen sulfide content is usually left in the ground, because it cannot be extracted and treated economically with present processing technology.

There are several aspects to the problem of treating natural gas to bring it to pipeline specifications. The first is the removal of impurities, primarily water, hydrogen sulfide and carbon dioxide; the second is loss of methane during processing. Processes that remove hydrogen sulfide and carbon dioxide may also remove a portion of the methane. Losses of less than about 3% are normally acceptable; losses of 3–10% may be acceptable if offset by other advantages; losses above 10% are normally unacceptable. A third aspect is the fate of the impurities once removed. Carbon dioxide can be discharged or reinjected, but hydrogen sulfide, which is toxic even in low concentrations, must be treated. If the waste stream containing hydrogen sulfide can be concentrated sufficiently, it may be passed to a Claus plant for conversion to sulfur. Waste streams containing low concentrations must be disposed of in some other way, such as a redox process of the LO CAT or Stretford type, for example, or, less desirably, flaring.

Choice of appropriate treatment is, therefore, not straightforward, and depends on the feed gas composition, the size and location of the plant and other variables.

When natural gas is treated, most plants handling large volumes of sour gas containing greater than about 200 ppm hydrogen sulfide use amine-based technology for acid gas removal. Amines commonly used include MEA, DEA, DIPA, DGA and MDEA. The plants can remove both carbon dioxide and hydrogen sulfide. When the amine solution is spent, the acid gases are flashed off and the solution is regenerated. The mechanical equipment in an amine plant makes it susceptible to failure. The plant includes heaters, aerial coolers, pumps, etc. and requires frequent quality checks and maintenance, making operational reliability probably the weakest feature of the technology.

Amine plants do not sorb methane to any significant extent, so methane loss is not an issue in this case. However, the hydrogen-sulfide-containing gas stream produced when the sorbent is regenerated must still be treated, subject to the same constraints as above.

As an alternative to amine sorption, or as a polishing step following any process, specialized scavenging or sulfur recovery processes, such as Sulfa-Scrub, Sulfa-Check, Chemsweet, Supertron 600, solid iron sponge or solid zinc oxide may be used for low-volume streams containing less than about 100 ppm hydrogen sulfide. Many scavengers present substantial disposal problems, however. In an increasing number of states, the spent scavenger constitutes toxic waste.

A considerable body of literature exists regarding membrane-based treatment of natural gas, mostly using cellulose acetate (CA) membranes to remove carbon dioxide. Membrane technology is attractive for this separation, because treatment can be accomplished using the high wellhead gas pressure as the driving force for the separation. Membrane systems, have, however, been slow to penetrate the market, and it is estimated that no more than about 1% of all processing is carried out using membranes. Nevertheless, for small-scale streams of appropriate composition, cellulose acetate membrane plants are state-of-the art, and up to 100 of these are believed to have been installed. Although all of these plants are designed to remove carbon dioxide, cellulose acetate membranes also have selectivity for hydrogen sulfide over methane, so they tend to coextract small amounts of hydrogen sulfide. Unless the raw gas stream contains very high concentrations of carbon dioxide, however, it is not possible to reduce a stream containing even modest amounts of hydrogen sulfide to pipeline specification (usually 4 ppm hydrogen sulfide) without vastly overprocessing as far as the carbon dioxide specification is concerned. If such overprocessing is performed, large amounts of methane are lost in the membrane permeate stream, and this is normally unacceptable.

Only a few of the many literature references relating to membrane-based carbon dioxide treatment specifically discuss removal of hydrogen sulfide in conjunction with the carbon dioxide. A paper by W. J. Schell et al. ("Separation of $CO_2$ from Mixtures by Membrane Permeation", presented at the Gas Conditioning Conference, University of Oklahoma, March 1983) says that "If the $H_2S$ level is low enough, the membrane system can also be used to meet pipeline specification for this component without any further treatment required." The paper shows a case where a cellulose acetate membrane system can be used to reach pipeline specification for carbon dioxide and hydrogen sulfide in two stages, starting with a feed content of 15% carbon dioxide and 250 ppm hydrogen sulfide, and points out that, for high concentrations of hydrogen sulfide, "a much larger number of elements are required to reduce the $H_2S$ levels to pipeline specification (¼ grain) than for $CO_2$ (3%)." The costs of membrane treatment are estimated to be more than 100% higher than conventional amine treatment in this case.

A report by N. N. Li et al. to the Department of Energy ("Membrane Separation Processes in the Petrochemical Industry", Phase II Final Report, September 1987) examined the effect of impurities, including hydrogen sulfide, on the ability of cellulose acetate membranes to remove carbon dioxide from natural gas. The reporters found that the membrane performance was not affected significantly by hydrogen sulfide alone. However, dramatic loss of membrane permeability was observed if both hydrogen sulfide and water vapor were present in the feed. The authors concluded that "successful use of these CA-based membranes must avoid processing gas which simultaneously has high $H_2O$ and $H_2S$ concentrations".

Another problem associated with cellulose acetate membranes is water, which is always present in raw natural gas streams to some extent, as vapor, entrained liquid, or both. The gas separation properties of cellulose acetate membranes are destroyed by contact with liquid water, so it is normally necessary to provide pretreatment to knock out any liquid water and to reduce the relative humidity low enough that there is no risk of condensation of water within the membrane modules on the permeate side. For example, the above-cited paper by W. J. Schell et al. ("Separation of $CO_2$ from Mixtures by Membrane Permeation", presented at the Gas Conditioning Conference, University of Oklahoma, March 1983) points out that "Even though membrane systems simultaneously dehydrate while removing $CO_2$, care must be taken to avoid contacting the membrane with liquid water. Feed gas streams saturated with water are normally preheated to at least 10° above the water dew point at the feed inlet pressure and the pressure tubes and inlet piping are insulated to prevent condensation."

The above-cited report by N. N. Li et al. ("Membrane Separation Processes in the Petrochemical Industry," Phase II Final Report, September 1987) presents data showing the effect of water vapor on membrane flux for cellulose acetate membranes, and concludes that "for relative humidities of 30% and higher, the flux decline is large, rapid, and irreversible". E. W. Funk et al. ("Effect of Impurities on Cellulose Acetate Membrane Performance", Recent Advances in Separation Techniques-III, AIChE Symposium Series, 250, Vol 82, 1986) advocate that "Moisture levels up to 20% RH appear tolerable but higher levels can cause irreversible membrane compaction".

U.S. Pat. No. 4,130,403 to T. E. Cooley et al. (Removal of $H_2S$ and/or $CO_2$ from a Light Hydrocarbon Stream by Use of Gas Permeable Membrane, 1978, Col. 12, lines 36-39) states that "It has been discovered that in order to function effectively, the feed gas to the cellulose ester membrane should be substantially water free". A second paper by W. J. Schell et al. ("Spiral-Wound Permeators for Purification and Recovery", Chemical Engineering Progress, October 1982, pages 33 37) confirms that "Liquid water is detrimental to the performance of the membrane, however, so that the feed gas is delivered to the membrane system at less than 90% relative humidity."

In other words, although cellulose acetate membranes will permeate water preferentially over methane, and hence have the capability to dehydrate the gas stream, care must be taken to keep the amounts of water vapor being processed low, and, according to some teachings, as low as 20-30% relative humidity.

In light of these limitations, considerable effort has been expended over the last few years in the search for membrane materials that would be better able to handle streams containing carbon dioxide plus secondary contaminants, notably hydrogen sulfide and water. Developers of membrane materials usually rely on the solution-diffusion model to predict vapor and gas permeation behavior. In this model, it is assumed that gas at the high-pressure side of the membrane dissolves in the membrane material and diffuses down a concentration gradient to the low-pressure side of the membrane, where the gas is desorbed. It is assumed that the gas phases on either side of the membrane are in thermodynamic equilibrium with their respective polymeric interfaces, and that the interfacial sorption and desorption processes are rapid compared to the rate of diffusion through the membrane. Thus, the rate-limiting step is diffusion. For simple gases, Fick's law leads to the equation:

$$J = \frac{Dk\Delta p}{l} \quad (1)$$

which can be further simplified to $$J = \frac{P\Delta p}{l} \quad (2)$$

where J is the membrane flux ($cm^3(STP)/cm^2 \cdot s \cdot cmHg$), D is the diffusion coefficient of the gas in the membrane ($cm^2/sec$) and is a measure of the gas mobility, l is the membrane thickness, k is the Henry's law sorption coefficient linking the concentration of the gas in the membrane material to the pressure in the adjacent gas ($cm^3(STP)/cm^3 \cdot cmHg$), and $\Delta p$ is the pressure difference across the membrane (cmHg).

The gas permeability $$P\frac{J \cdot l}{\Delta p} = Dk \quad (3)$$

is a property of the membrane material and is independent of membrane thickness. In this definition, permeability is a measure of the rate at which a particular gas moves through a membrane of standard thickness (1 cm) under a standard pressure difference (1 cmHg). The convenient permeability unit, $1 \times 10^{-10}$ $cm^3(STP) \cdot cm/cm^2 \cdot s \cdot cmHg$, is often called a Barrer, after R. M. Barrer, a pioneer in membrane permeation studies.

A measure of the ability of a membrane to separate two gases, A and B, is the ratio of their permeabilities, a, called the membrane selectivity, $$\alpha_{A/B} = \frac{P_{(A)}}{P_{(B)}} \quad (4)$$

Equation (4) can also be written as $$\alpha_{A/B} = \left[\frac{D_A}{D_B}\right]\left[\frac{k_A}{k_B}\right] \quad (5)$$

The ratio $D_A/D_B$ is the ratio of the diffusion coefficients of the two gases and can be viewed as the mobility selectivity, reflecting the different sizes of the two molecules. The ratio $k_A/k_B$ is the ratio of the Henry's law solubility coefficients of the two gases and can be viewed as the solubility selectivity, reflecting the relative condensabilities of the two gases.

In all polymer materials, the diffusion coefficient decreases with increasing molecular size, because large molecules interact with more segments of the polymer chain than small molecules. Hence, the mobility coefficient always favors the passage of small molecules over large ones. The sorption coefficient, on the other hand, is a measure of the energy required for the permeant to be sorbed by the polymer and increases with the condensability of the permeant. This dependence on condensability means that the sorption coefficient increases with molecular diameter, because large molecules are normally more condensable than smaller ones. The combined effect of these two factors determines the selectivity of the membrane.

The balance between mobility selectivity and sorption selectivity is different for glassy and rubbery polymers. In glassy polymers, the mobility term is usually dominant, permeability falls with increasing permeant size and small molecules permeate preferentially. In rubbery polymers, the sorption term is usually dominant, permeability increases with increasing permeant size and larger molecules permeate preferentially. Since both carbon dioxide (3.3 Å) and hydrogen sulfide (3.6 Å) have smaller kinetic diameters than methane (3.8 Å), and since both carbon dioxide and hydrogen sulfide are more condensable than methane, both glassy and rubbery membranes are selective for the acid gas components over methane. To date, however, most membrane development work in this area has focused on glassy materials, of which cellulose acetate is the most successful example.

In citing selectivity, it is important to be clear as to how the permeation data being used have been measured. It is common to measure the fluxes of different gases separately, then to calculate selectivity as the ratio of the pure gas permeabilities. This gives the "ideal" selectivity for that pair of gases. Pure gas measurements are more commonly reported than mixed gas experiments, because pure gas experiments are much easier to perform. Measuring the permeation data using gas mixtures, then calculating the selectivity as the ratio of the gas fluxes, gives the actual selectivity that can be achieved under real conditions. In gas mixtures that contain condensable components, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its discriminating capabilities.

A technique for predicting mixed gas performance under real conditions from pure gas measurements with any reliability has not yet been developed. In the case of gas mixtures such as carbon dioxide/methane with other components, the expectation is that the carbon dioxide at least will have a swelling or plasticizing effect, thereby changing the membrane permeation characteristics. This expectation is borne out by cellulose acetate membranes. For example, according to a paper by M. D. Donahue et al. ("Permeation behavior of carbon dioxide-methane mixtures in cellulose acetate membranes", Journal of Membrane Science, 42, 197–214, 1989) when measured with pure gases, the carbon dioxide permeability of asymmetric cellulose acetate is $9.8 \times 10^{-5}$ cm$^3$/cm$^2$.s.kPa and the methane permeability is $2.0 \times 10^{-6}$ cm$^3$/cm$^2$.s.kPa, giving an ideal selectivity of about 50. Yet the actual selectivity obtained with mixed gases is typically in the range 10–20, a factor of 3–5 times lower than the ideal selectivity. For example, the report to DOE by Norman Li et al., discussed above, gives carbon dioxide/methane selectivities in the range 9–15 for one set of field trials (at 870–905 psi feed pressure) and 12 for another set (at 200 psig feed pressure) with a highly acid feed gas. The W. J. Schell et al. Chemical Engineering Progress paper, discussed above, gives carbon dioxide/methane selectivities of 21 (at 250–450 psig feed pressure) and 23 (at 800 psig feed pressure). Thus, even in mixed gas measurements, a wide spread of selectivities is obtained, the spread depending partly on operating conditions. In particular, the plasticizing or swelling effect of the carbon dioxide on the membrane tends to show pressure dependence, although it is sometimes hard to distinguish this from other effects, such as the contribution of secondary condensable components.

As a first step in developing a new membrane, it is normal to start by testing with pure gases under mild operating conditions. Membranes that appear to pass this test can then be developed and tested further, modified, optimized and scaled up, leading eventually to field tests, full-scale demonstration and ultimately, industrial acceptance. Candidate membranes can and do fall by the wayside at each step along this path, for diverse reasons.

The search for improved membranes for removing acid components from gas streams, although it has focused primarily on glassy membranes, encompasses several types of membranes and membrane materials. A paper by A. Deschamps et al. ("Development of Gaseous Permeation Membranes adapted to the Purification of Hydrocarbons", I.I.F-I.I.R-Commission A3, Paris, 1989) describes work with aromatic polyimides having an intrinsic material selectivity of 80 for carbon dioxide over methane and 200,000 for water vapor over methane. The paper defines the target selectivities that the researchers were aiming for as 50 for carbon dioxide/methane and 200 for water vapor/methane. The paper, which is principally directed to dehydration, does not give carbon dioxide/methane selectivities, except to say that they were "generally low", even though the experiments were carried out with pure gas samples. In other words, despite the high intrinsic selectivity of 80, the lower target value of 50 could not be reached.

British patent number 1,478,083, to Klass and Landahl, presents a large body of permeation data obtained with methane/carbon dioxide/hydrogen sulfide mixed gas streams and polyamide (nylon 6 and nylon 6/6), polyvinyl alcohol (PVA), polyacrylonitrile (PAN) and gelatin membranes. Some unexpectedly high selectivities are shown. For the nylon membranes, carbon dioxide/methane selectivities of up to 30, and hydrogen sulfide/methane selectivities up to 60, are reported. The best carbon dioxide/methane selectivity is 160, for PAN at a temperature of 30° C. and a feed pressure of 65 psia; the best hydrogen sulfide/methane selectivity is 200, for gelatin at the same conditions. In both cases, however, the permeability is extremely low: for carbon dioxide through PAN, less than $5 \times 10^{-4}$ Barrer and for hydrogen sulfide through gelatin, less than $3 \times 10^{-3}$ Barrer. These low permeabilities would make the transmembrane fluxes miserable for any practical purposes. It is also unknown whether the gelatin membrane, which was plasticized with glycerin, would be stable much above the modest pressures under which it was tested.

U.S. Pat. No. 4,561,864, also to Klass and Landahl, incorporates in its text some of the data reported in the British patent discussed above. The '864 patent also includes a table of calculations for cellulose acetate membranes, showing the relationship between "Figure of Merit", a quantity used to express the purity and methane recovery in the residue stream, as a function of "Flow Rate Factor", a quantity that appears to be somewhat akin to stage-cut. In performing the calculations, separation factors (where the separation factor is the sum of the carbon dioxide/methane selectivity and the hydrogen sulfide/methane selectivity) of 20 to 120 are assumed. The figures used in the calculations appear to range from the low end of the combined carbon dioxide and hydrogen sulfide selectivities from mixed gas data to the high end of the combined selectivities calculated from pure gas data.

A paper by D. L. Ellig et al. ("Concentration of Methane from Mixtures with Carbon Dioxide by permeation through Polymeric Films", Journal of Membrane Science, 6, 259-263, 1980) summarizes permeation tests carried out with 12 different commercially available films and membranes, using a mixed gas feed containing 60% carbon dioxide, 40% methane, but no hydrogen sulfide or water vapor. The tests were carried out at 2,068 kPa (about 300 psi) feed pressure. The results show selectivities of about 9-27 for cellulose acetate, up to 40 for polyethersulfone and 20-30 for polysulfone. One of the membranes tested was nylon, which, in contradiction to the results reported by Klass and Landahl, showed essentially no selectivity at all for carbon dioxide over methane.

The already much-discussed DOE Final Report by N. N. Li et al. contains a section in which separation of polar gases from non-polar gases by means of a mixed-matrix, facilitated transport membrane is discussed. The membrane consists of a silicone rubber matrix carrying polyethylene glycol, which is used to facilitate transport of polar gases, such as hydrogen sulfide, over nonpolar gases, such as methane. In tests on natural gas streams, the membranes exhibited hydrogen sulfide/methane selectivity of 25-30 and carbon dioxide/methane selectivity of 7-8, which latter number was considered too low for practical carbon dioxide separation. The membrane was also shown to be physically unstable at feed pressure above about 170 psig, which, even if the carbon dioxide/methane selectivity were adequate, would render it unsuitable for handling raw natural gas streams. U.S. Pat. Nos. 4,608,060, to S. Kulprathipanja, and 4,606,740, to S. Kulprathipanja and S. S. Kulkarni, of Li's group at UOP, present additional data using the same type of glycol-laden membranes as discussed in the DOE report. In this case, however, pure gas tests were performed and ideal hydrogen sulfide/methane selectivities as high as 115-185 are quoted. It is interesting to note that these are 4-8 times higher than the later measured mixed gas numbers quoted in the DOE report. The same effect obtains for carbon dioxide, where the pure gas selectivities are in the range 21-32 and the mixed gas data give selectivities of 7-8.

Similar in concept is U.S. Pat. No. 4,737,166, to S. L. Matson et al., which discloses an immobilized liquid membrane typically containing n-methylpyrrolidone or another polar solvent in cellulose acetate or any other compatible polymer. The membranes and processes discussed in this patent are directed to selective hydrogen sulfide removal, in other words leaving both the methane and the carbon dioxide behind in the residue stream. As in the UOP patents, very high hydrogen sulfide/methane selectivities, in the range 90-350, are quoted. Only pure gas data are given, however, and the feed pressure is 100 psig. There is no discussion as to how the membranes might behave when exposed to multicomponent gas streams and/or high feed pressures. Based on the UOP teachings, the mixed gas, high-pressure results might be expected to be not so good.

U.S. Pat. No. 4,781,733, to W. C. Babcock et al., describes results obtained with an interfacial composite membrane made by a polycondensation reaction between a diacid-chloride-terminated silicone rubber and a diamine. In pure gas experiments at 100 psig, the membrane exhibited hydrogen sulfide/methane selectivities up to 47 and carbon dioxide/methane selectivities up to 50. No mixed gas or high-pressure data are given.

U.S. Pat. No. 4,493,716, to R. H. Swick, reports permeation results obtained with a composite membrane consisting of a polysulfide polymer on a Goretex (polytetrafluoroethylene) support. Only pure gas, low-pressure test cell permeability data are given. Based on the reported permeabilities, which only give an upper limit for the methane permeability, the membrane appears to have a hydrogen sulfide/methane selectivity of at least 19-42 and a carbon dioxide/methane selectivity of at least 2-6. Some results show that the carbon dioxide permeability increased after exposure to hydrogen sulfide, which might suggest an overall decrease in selectivity if the membrane has become generally more permeable, although no methane data that could confirm or refute this are cited.

U.S. Pat. No. 4,963,165, to I. Blume and I. Pinnau reports pure gas, low-pressure data for a composite membrane consisting of a polyamide-polyether block copolymer on a polyamide support. Hydrogen sulfide/methane selectivities in the range 140-190, and carbon dioxide/methane selectivities in the range 18-20, are quoted. Mixed gas data for a stream containing oxygen, nitrogen, carbon dioxide and sulfur dioxide are also quoted and discussed in the text, but it is not clear how these data would compare with those for methane- or hydrogen-sulfide-containing mixed gas streams.

Despite the many and varied research and development efforts that this body of literature represents, cellulose acetate membranes, with their attendant advantages and disadvantages, remain the only membrane type whose properties in handling acid gas streams under real gas-field operating conditions are reasonably well understood, and the only membrane type in commercial use for removing acid gas components from methane.

U.S. Pat. No. 4,589,896, to M. Chen et al., exemplifies the type of process that must be adopted to remove carbon dioxide and hydrogen sulfide from methane and other hydrocarbons when working within the performance limitations of cellulose acetate membranes. The process is directed at natural gas streams with a high acid gas content, or at streams from enhanced oil recovery (EOR) operations, and consists of a multistage membrane separation, followed by fractionation of the acid gas components and multistage flashing to recover the hydrogen sulfide. The acid-gas-depleted residue stream is also subjected to further treatment to recover hydrocarbons. The raw gas to be treated typically contains as much as 80% or more carbon dioxide, with hydrogen sulfide at the relatively low, few thousands of ppm level. Despite the fact that the ratio of the carbon dioxide content to the hydrogen sulfide content is high (about 400:1), the raw gas stream must be passed through a minimum of four membrane stages, arranged in a three-step, two-stage configuration, to achieve good hydrogen sulfide removal. The goal is not to bring the raw gas stream to natural gas pipeline specification, but rather to recover relatively pure carbon dioxide, free from hydrogen sulfide, for further use in EOR. The target concentration of carbon dioxide in the treated hydrocarbon stream is less than 10%, which would, of course, not meet natural gas pipeline standards. The methane left in the residue stream after higher hydrocarbon removal is simply used to strip carbon dioxide from hydrogen-sulfide-rich solvent in a later part of the separation process; no methane passes to a natural gas pipeline. Despite the multistep/multistage membrane arrangement, in a representative example, about 7% carbon dioxide is left in the hydrocarbon residue stream after processing, and about 12% hydrocarbon loss into the permeate takes place.

In summary, it may be seen that there remains a need for improved membranes and improved processes for handling streams containing methane, acid gas components and water vapor.

SUMMARY OF THE INVENTION

The invention provides improved membranes and improved membrane processes for treating gas streams containing hydrogen sulfide, carbon dioxide, water vapor and methane, particularly natural gas streams. The processes rely on the availability of two membrane types: one, cellulose acetate, or a material with similar properties, characterized by a mixed gas carbon dioxide/methane selectivity of about 20 and a mixed gas hydrogen sulfide/methane selectivity of about 25; the other an improved membrane with a much higher mixed gas hydrogen sulfide/methane selectivity of at least about 30, 35 or 40 and a mixed gas carbon dioxide/methane selectivity of at least about 12. These selectivities must be achievable with gas streams containing at least methane, carbon dioxide and hydrogen sulfide and at feed pressures of at least 500 psig, more preferably 800 psig, most preferably 1,000 psig.

An important aspect of the invention is the availability of membranes with much higher hydrogen sulfide/methane selectivities than cellulose acetate. This provides the flexibility to choose between the membrane with the higher carbon dioxide/methane selectivity, in treating streams containing little hydrogen sulfide relative to carbon dioxide; the membrane with the higher hydrogen sulfide/methane selectivity, in treating streams containing substantial amounts of hydrogen sulfide relative to carbon dioxide; and a mixed membrane configuration in treating streams in the intermediate category.

The availability of the two membrane types enables treatment processes balanced in terms of the two membranes, so as to optimize any process attribute accordingly, to be designed. Based on the different permeation properties of the two membrane types, we have discovered that it is possible, through computer modeling, to define gas composition zones in which a particular treatment process is favored. For example, if it is the primary goal to minimize methane loss in the membrane permeate, it may be better to carry out the treatment using only the more hydrogen-sulfide-selective membrane, only the more carbon-dioxide-selective membrane or a mixture of both, depending on the particular feed gas composition. Similar determinations may be made if the amount of membrane area used is to be minimized, the costs and energy of recompression are to be kept below a target value, the hydrogen sulfide concentration in the permeate is to be maximized, the overall operating costs are to be reduced, or any other membrane process attribute is to be the key design factor.

As specific examples of this general teaching, we have discovered that:

1. If the feed gas to the membrane system contains less than about 3% carbon dioxide to less than about 10% carbon dioxide and more than about 10 ppm hydrogen sulfide to more than about 300 ppm hydrogen sulfide, with the lower end of the carbon dioxide range corresponding to the lower end of the hydrogen sulfide range (<3% carbon dioxide; >10 ppm hydrogen sulfide) and the upper end of the carbon dioxide range corresponding to the upper end of the hydrogen sulfide range (<10% carbon dioxide; >300 ppm hydrogen sulfide), then the most favorable process, in terms of minimizing methane loss, is carried out using the more hydrogen-sulfide-selective membrane only. Likewise, if the feed gas contains less than about 10% carbon dioxide to less than about 20% carbon dioxide and more than about 300 ppm hydrogen sulfide to more than about 600 ppm hydrogen sulfide, or less than about 20% carbon dioxide to less than about 40% carbon dioxide and more than about 600 ppm hydrogen sulfide to more than about 1% hydrogen sulfide, with the lower and upper ends of the ranges corresponding as before, the most favorable process will use the more hydrogen-sulfide-selective membrane only.

2. If the feed gas contains less than about 5 ppm hydrogen sulfide to less than about 50 ppm hydrogen sulfide and more than about 3% carbon dioxide to more than about 15% carbon dioxide, with the lower end of the carbon dioxide range corresponding to the lower end of the hydrogen sulfide range (<5 ppm hydrogen sulfide; >3% carbon dioxide) and the upper end of the carbon dioxide range corresponding to the upper end of the hydrogen sulfide range (<50 ppm hydrogen sulfide; >15% carbon dioxide), then the most favorable process, in terms of minimizing methane loss, is carried out using the more carbon-dioxide-selective membrane only. Likewise, if the feed gas contains less than about 50 ppm hydrogen sulfide to less than about 250 ppm hydrogen sulfide and more than about 15% carbon dioxide to more than about 50% carbon dioxide, or less than about 250 ppm hydrogen sulfide to less than about 500 ppm hydrogen sulfide and more than about 50% carbon dioxide to more than about 85% carbon dioxide, with the lower and upper ends of the ranges corresponding as before, the most favorable process will use the more carbon-dioxide-selective membrane only.

3. For feed gas compositions outside the ranges specified in points 1 and 2 above, the most favorable process, in terms of minimizing methane loss, is carried out using a combination of the more hydrogen-sulfide-selective and the more carbon-dioxide-selective membranes.

If a combination of the two membrane types is to be used, the preferred configuration is to pass the gas stream first through modules containing the one membrane type, then to pass the residue stream from the first bank of modules through a second bank containing membranes of the other type. If the raw gas stream contains significant amounts of water, for example, it is preferable to use the more hydrogen-sulfide-selective membrane first. These membranes are not usually damaged by water, and can handle gas streams having very high relative humidities, up to saturation. Furthermore, the membranes are very permeable to water vapor, and so can be used to dehydrate the gas stream before it passes to the second bank of modules. Any membranes that can achieve the necessary carbon dioxide/methane and hydrogen sulfide/methane selectivities under mixed gas, high-pressure conditions, plus provide commercially useful transmembrane fluxes, can be used. The most preferred material for the more carbon-dioxide-selective membrane is cellulose acetate or its variants. The most preferred material for the more hydrogen-sulfide-selective membrane is a polyamide-polyether block copolymer having the general formula

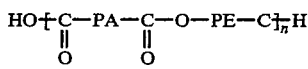

where PA is a polyamide segment, PE is a polyether segment and n is a positive integer. Such polymers are available commercially as Pebax ® from Atochem Inc., Glen Rock, N.J. or as Vestamid ® from Nuodex Inc., Piscataway, N.J.

In their most basic embodiments, the processes of the invention make use of a one-stage membrane design, if a single membrane type is indicated, and a two-step membrane design, in which the residue from the first step becomes the feed for the second step, if a combination of membrane types is indicated. It is possible, however, to optimize the process in light of the various aspects of gas treatment discussed above, namely removal of impurities, loss of methane, and ultimate fate of the impurities. To simultaneously meet pipeline specifications, minimize methane loss and produce a waste stream containing a high hydrogen sulfide concentration, it may be desirable, for example, to use a two-stage (or more complicated) membrane configuration, in which the permeate from the first stage becomes the feed for the second. This will both increase the concentration of hydrogen sulfide in the second stage permeate and reduce the methane loss.

The membrane process may also be combined with one or more non-membrane processes, to provide a treatment scheme that delivers pipeline quality methane, on the one hand, and that concentrates and disposes of the acid-gas-laden waste stream, in an environmentally acceptable manner, on the other.

The processes of the invention exhibit a number of advantages compared with previously available acid gas treatment technology. First, provision of a membrane with much higher selectivity for hydrogen sulfide over methane makes it possible, for the first time, to apply membrane treatment efficiently to gas streams characterized by relatively high concentrations of hydrogen sulfide. Secondly, the processes are much better at handling gas streams of high relative humidity. Thirdly, it is sometimes possible to bring a natural gas stream into pipeline specifications for all three of carbon dioxide, hydrogen sulfide and water vapor with a single membrane treatment. Fourthly, overprocessing of the gas stream by removing the carbon dioxide to a much greater extent than is actually necessary, simply to bring the hydrogen sulfide content down, can be avoided. Fifthly, much greater flexibility to adjust membrane operating and performance parameters is provided by the availability of two types of membranes. Sixthly, the process can be optimized for any chosen process attribute by calculating the appropriate membrane mix to use.

DETAILED DESCRIPTION OF THE INVENTION

Figure 1:
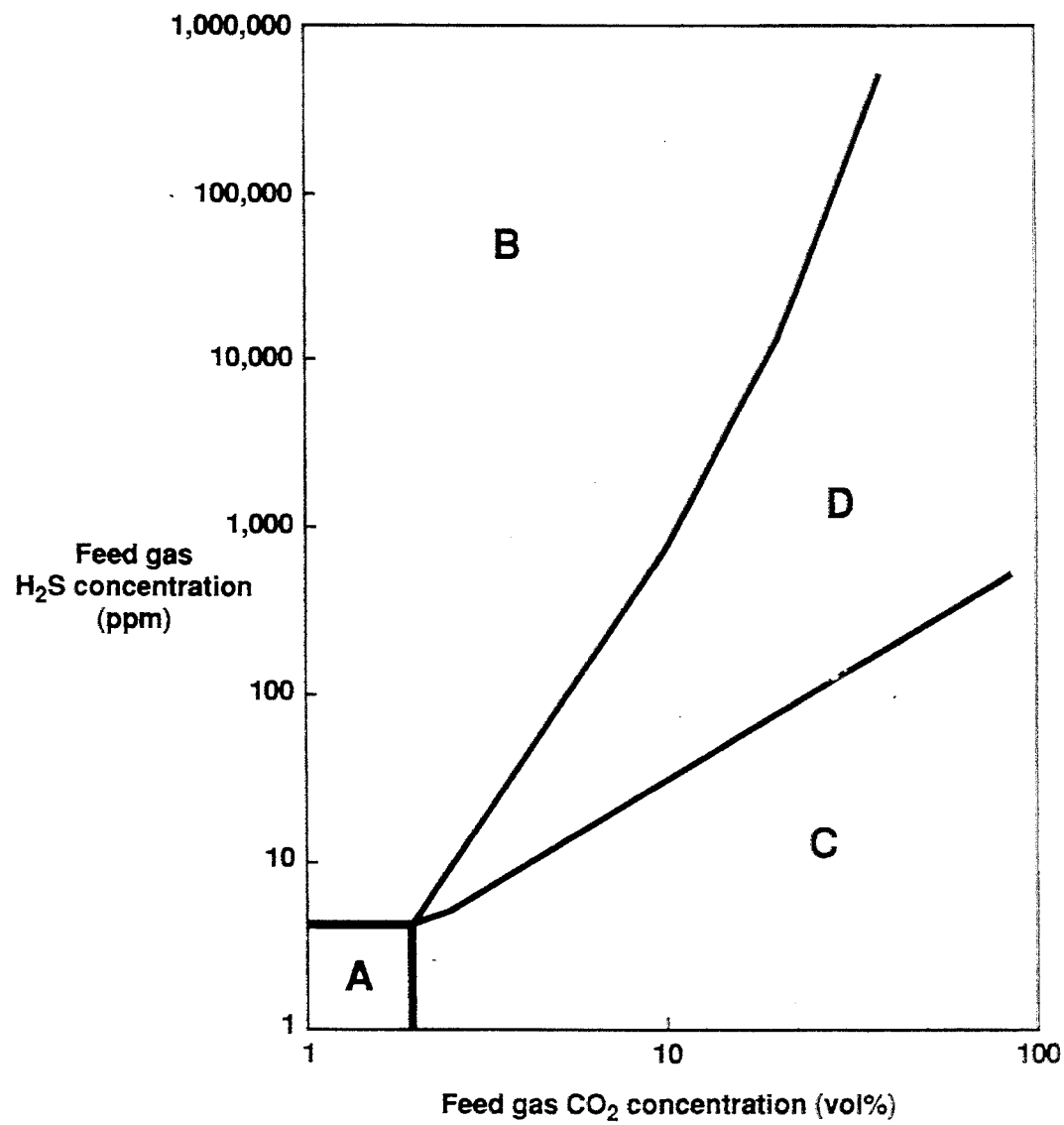
FIG. 1 is a diagram showing zones in which particular membranes should be used to separate hydrogen sulfide and carbon dioxide from methane.

The term intrinsic selectivity, as used herein, means the selectivity of the polymer material itself, calculated as the ratio of the permeabilities of two gases or vapors through a thick film of the material, as measured with pure gas or vapor samples.

The term ideal selectivity, as used herein, means the selectivity of a membrane, calculated as the ratio of the permeabilities of two gases or vapors through the membrane, as measured with pure gas or vapor samples.

The terms mixed gas selectivity and actual selectivity, as used herein, mean the selectivity of a membrane, calculated as the ratio of the permeabilities of two gases or vapors through the membrane, as measured with a gas mixture containing at least the two gases or vapors in question.

The invention has several aspects. In one aspect, the invention concerns processes for treating gas mixtures containing carbon dioxide in certain concentrations, hydrogen sulfide in certain concentrations and methane, to remove the carbon dioxide and hydrogen sulfide. In another aspect, the invention concerns optimizing such membrane separation processes in terms of a particular process attribute. This optimizing may be done to minimize the methane loss from the membrane process, to maximize the hydrogen sulfide concentration in the permeate stream, or to provide the best fit between the membrane process and a non-membrane process or processes acting together as a "hybrid" process, for example. In yet another aspect, the invention concerns membranes that maintain high hydrogen sulfide/methane selectivities when challenged with mixed gas streams under high pressures.

The processes of the invention rely on the availability of two membrane types: one, cellulose acetate, or a material with similar properties, characterized by a mixed gas carbon dioxide/methane selectivity of about 20 and a mixed gas hydrogen sulfide/methane selectivity of about 25; the other a membrane with a much higher mixed gas hydrogen sulfide/methane selectivity of at least about 30, 35 or 40 and a mixed gas carbon dioxide/methane selectivity of at least about 12. These selectivities must be achievable with gas streams containing at least methane, carbon dioxide and hydrogen sulfide and at feed pressures of at least 500 psig, more preferably 800 psig, most preferably 1,000 psig.

The invention provides three forms of basic membrane treatment process:
1. Using only the more hydrogen-sulfide-selective membrane
2. Using only the more carbon-dioxide-selective membrane
3. Using a combination of both types of membrane.

Based on the different permeation properties of the two membrane types, we have discovered that it is possible, through computer modeling, to define gas composition zones most amenable to each one of these three types of basic processes. In performing the computer calculation, a specific process attribute is used as a basis for calculating the boundaries of the gas composition zones. It will be apparent to those of ordinary skill in the art that any one of many process attributes could serve as the basis for the calculation. Representative, non-limiting, examples include methane loss, membrane area, stage cut, energy consumption, annual operating costs, permeate composition, residue composition, best match with other processes in the treatment train, volume/composition of recycle streams, and so on.

Loss of methane is usually one of the most important factors in natural gas processing. On the one hand, pipeline grade methane is the desired product, and substantial losses of product have a substantial adverse effect on the process economics. On the other hand, large quantities of methane in the acid gas stream make further handling and recovery of any useful products from this stream much more difficult. As a general rule, a successful natural gas treatment process should keep methane losses during processing to no more than about 10%, and preferably no more than about 5%.

For simplicity, therefore, most of the discussion and examples have been directed to processes designed to minimize methane losses, although it should be appreciated that the scope of the invention is intended to encompass any process design calculations done with the same goal, namely, defining zones applicable to the various processing options made possible by the two membrane types.

We believe the concept of these zones, how to calculate them and how to use them, is new, and will be useful in treating any gas stream that comprises methane, carbon dioxide and hydrogen sulfide. Such streams arise from natural gas wells, from carbon dioxide miscible flooding for enhanced oil recovery (EOR) and from landfills, for example. We believe that it will be particularly useful in the sweetening of natural gas containing acid gas components.

Referring now to FIG. 1, this shows a typical zone diagram, with feed gas carbon dioxide concentration on one axis and hydrogen sulfide concentration on the other. The diagram was prepared by running a series of membrane separation computer simulations for hypothetical three-component (methane, carbon dioxide, hydrogen sulfide) gas streams of particular flow rates and compositions. In all cases, the target was to bring the stream to a pipeline specification of 4 ppm hydrogen sulfide and 2% carbon dioxide. The membrane properties were assumed to be as follows:

| More $CO_2$-selective membrane: | |
|---|---|
| Carbon dioxide/methane selectivity: | 20 |
| Hydrogen sulfide/methane selectivity: | 25 |
| Methane flux: | $7.5 \times 10^{-6}$ cm$^3$(STP)/ cm$^2 \cdot$ s $\cdot$ cmHg |
| More $H_2S$-selective membrane: | |
| Carbon dioxide/methane selectivity: | 13 |
| Hydrogen sulfide/methane selectivity: | 50 |
| Methane flux: | $7.5 \times 10^{-6}$ cm$^3$(STP)/ cm$^2 \cdot$ s $\cdot$ cmHg |

Figure 9:
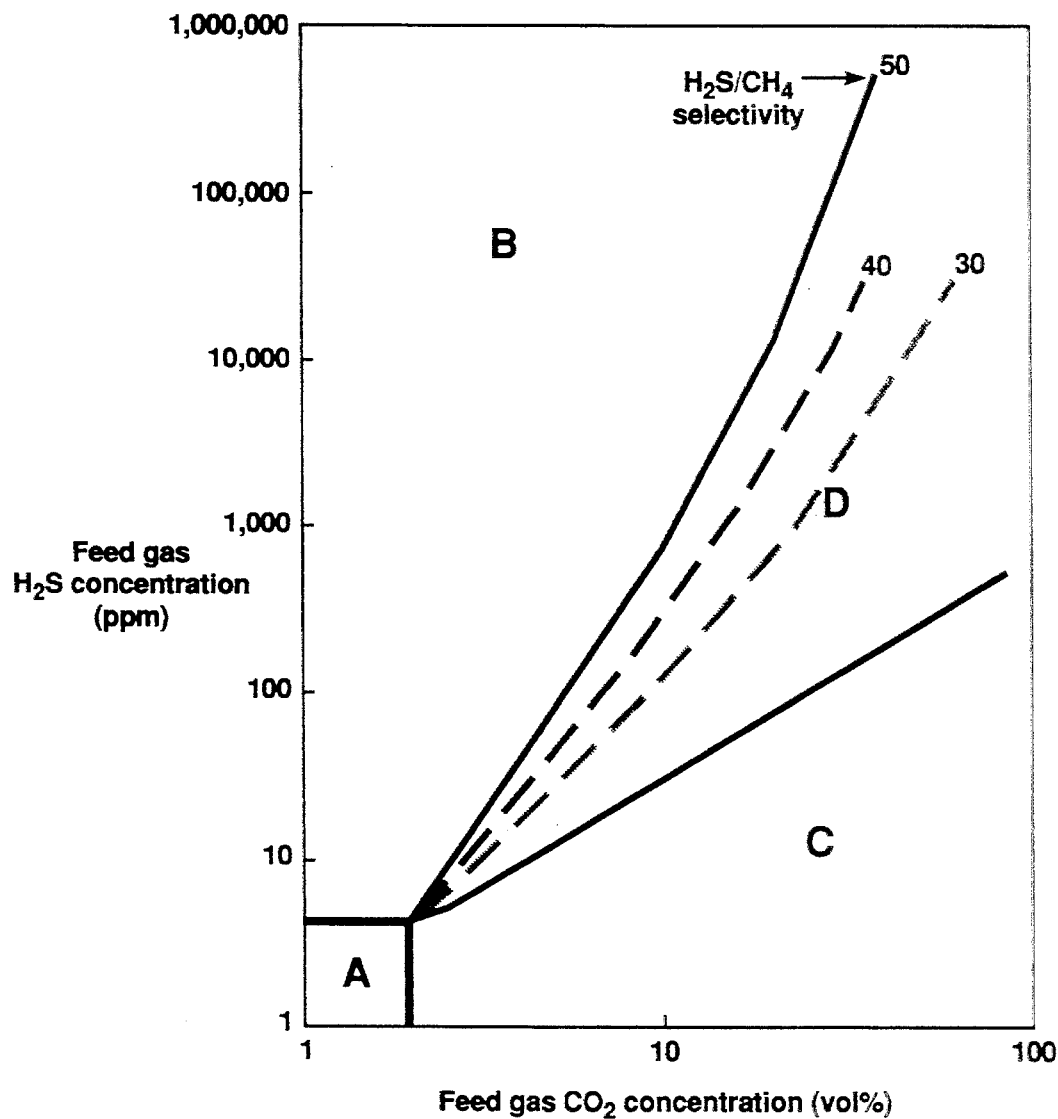
FIG. 9 is a diagram showing zones in which particular membranes should be used to separate hydrogen sulfide and carbon dioxide from methane, based on different hydrogen sulfide/methane selectivities.
Figure 10:
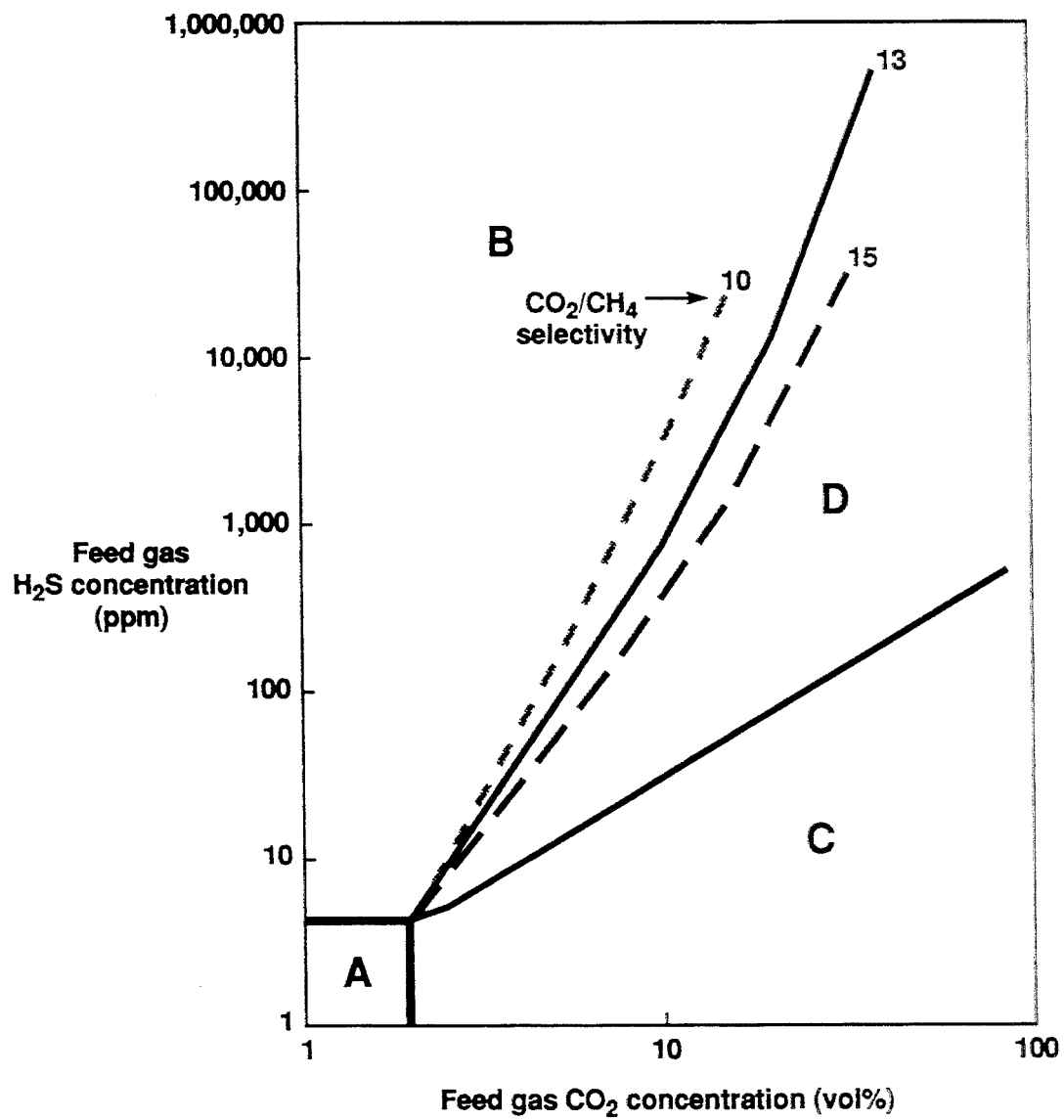
FIG. 10 is a diagram showing zones in which particular membranes should be used to separate hydrogen sulfide and carbon dioxide from methane, based on different carbon dioxide/methane selectivities.

In each case, the methane loss into the permeate stream that would occur if a one-stage membrane separation process were to be carried out was calculated, and was used to define zones of least methane loss. As can be seen, FIG. 1 is divided into four zones. In zone A, no treatment is required, because the gas already contains less than 2% carbon dioxide and less than 4 ppm hydrogen sulfide. In zone B, methane loss is minimized if the more hydrogen-sulfide-selective membrane alone is used. In zone C, methane loss is minimized if the more carbon-dioxide-selective membrane alone is used. In zone D, methane loss is minimized by using a combination of the two membrane types. The zones are calculated based on the membrane selectivity and their exact position will change if the membrane selectivity changes. FIGS. 9 and 10 show the change in the B/D boundary for hydrogen sulfide/methane selectivities of 30, 40 and 50 and for carbon dioxide/methane selectivities of 10, 13 and 15.

The zone diagram may be used directly to determine the best type of membrane to use for a specific separation by reading off the zone into which the feed composition fits.

Another way to use the diagram is to define concentration bands that can serve as guidelines in selecting a membrane process. Again referring to FIGS. 1, 9 and 10, we have discovered that, as a guide, three carbon dioxide concentration bands may be defined, thus:

1. (a) If the feed gas to the membrane system contains less than about 3% carbon dioxide to less than about 10% carbon dioxide and more than about 10 ppm hydrogen sulfide to more than about 300 ppm hydrogen sulfide, with the lower end of the carbon dioxide range corresponding to the lower end of the hydrogen sulfide range (<3% carbon dioxide; >10 ppm hydrogen sulfide) and the upper end of the carbon dioxide range corresponding to the upper end of the hydrogen sulfide range (<10% carbon dioxide; >300 ppm hydrogen sulfide), then the most favorable process, in terms of minimizing methane loss, is carried out using the more hydrogen-sulfide-selective membrane only.

(b) If the feed gas contains less than about 10% carbon dioxide to less than about 20% carbon dioxide and more than about 300 ppm hydrogen sulfide to more than about 600 ppm hydrogen sulfide, with the lower end of the carbon dioxide range corresponding to the lower end of the hydrogen sulfide range (<10% carbon dioxide; >300 ppm hydrogen sulfide) and the upper end of the carbon dioxide range corresponding to the upper end of the hydrogen sulfide range (<20% carbon dioxide; >600 ppm hydrogen sulfide), then the most favorable process, in terms of minimizing methane loss, is carried out using the more hydrogen-sulfide-selective membrane only.

(c) If the feed gas contains less than about 20% carbon dioxide to less than about 40% carbon dioxide and more than about 600 ppm hydrogen sulfide to more than about 1% hydrogen sulfide, with the lower end of the carbon dioxide range corresponding to the lower end of the hydrogen sulfide range (<20% carbon dioxide; >600 ppm hydrogen sulfide) and the upper end of the carbon dioxide range corresponding to the upper end of the hydrogen sulfide range (<40% carbon dioxide; >1% hydrogen sulfide), then the most favorable process, in terms of minimizing methane loss, is carried out using the more hydrogen-sulfide-selective membrane only.

Also, three hydrogen sulfide concentration bands may be defined, thus:

2. (a) If the feed gas contains less than about 5 ppm hydrogen sulfide to less than about 50 ppm hydrogen sulfide and more than about 3% carbon dioxide to more than about 15% carbon dioxide, with the lower end of the carbon dioxide range corresponding to the lower end of the hydrogen sulfide range (<5 ppm hydrogen sulfide; >3% carbon dioxide) and the upper end of the carbon dioxide range corresponding to the upper end of the hydrogen sulfide range (<50 ppm hydrogen sulfide; >15% carbon dioxide), then the most favorable process, in terms of minimizing methane loss, is carried out using the more carbon-dioxide-selective membrane only.

(b) If the feed gas contains less than about 50 ppm hydrogen sulfide to less than about 250 ppm hydrogen sulfide and more than about 15% carbon dioxide to more than about 50% carbon dioxide, with the lower end of the carbon dioxide range corresponding to the lower end of the hydrogen sulfide range (<50 ppm hydrogen sulfide; >15% carbon dioxide) and the upper end of the carbon dioxide range corresponding to the upper end of the hydrogen sulfide range (<250 ppm hydrogen sulfide; >50% carbon dioxide), then the most favorable process, in terms of minimizing methane loss, is carried out using the more carbon-dioxide-selective membrane only.

(c) If the feed gas contains less than about 250 ppm hydrogen sulfide to less than about 500 ppm hydrogen sulfide and more than about 50% carbon dioxide to more than about 85% carbon dioxide, with the lower end of the carbon dioxide range corresponding to the lower end of the hydrogen sulfide range (<250 ppm hydrogen sulfide; >50% carbon dioxide) and the upper end of the carbon dioxide range corresponding to the upper end of the hydrogen sulfide range (<500 ppm hydrogen sulfide; >85% carbon dioxide), then the most favorable process, in terms of minimizing methane loss, is carried out using the more carbon-dioxide-selective membrane only.

Also:

3. For feed gas compositions outside the ranges specified in points 1 and 2 above, the most favorable process, in terms of minimizing methane loss, is carried out using a combination of the more hydrogen-sulfide-selective and the more carbon-dioxide-selective membranes.

For instance, using either the zone diagram itself or these concentration bands:

(i) If the carbon dioxide content of the stream is 4.5%, and the hydrogen sulfide content is 1,500 ppm, the more hydrogen-sulfide-selective membrane only should be used.

(ii) If the carbon dioxide content of the stream is 4.5% and the hydrogen sulfide content is 7 ppm, the more carbon-dioxide selective membrane only should be used.

(iii) If the carbon dioxide content of the stream is 4.5% and the hydrogen sulfide content is 25 ppm, a combination membrane system should be used.

(iv) If the carbon dioxide content of the stream is 7% and the hydrogen sulfide content is 10,000 ppm, the more hydrogen-sulfide-selective membrane only should be used.

(v) If the carbon dioxide content of the stream is 7% and the hydrogen sulfide content is 2 ppm (already within spec.), the more carbon-dioxide-selective membrane only should be used.

(vi) If the carbon dioxide content of the stream is 7% and the hydrogen sulfide content is 50 ppm, a combination membrane system should be used.

(vii) If the carbon dioxide content of the stream is 10% and the hydrogen sulfide content is 1,000 ppm, the more hydrogen-sulfide-selective membrane only should be used.

(viii) If the carbon dioxide content of the stream is 10% and the hydrogen sulfide content is 20 ppm, the more carbon-dioxide-selective membrane only should be used.

(ix) If the carbon dioxide content of the stream is 10%, and the hydrogen sulfide content is 100 ppm, a combination membrane system should be used.

(x) If the carbon dioxide content of the stream is 16% and the hydrogen sulfide content is 7,000 ppm, the more hydrogen-sulfide-selective membrane only should be used.

(xi) If the carbon dioxide content of the stream is 16% and the hydrogen sulfide content is 8 ppm, the more carbon-dioxide-selective membrane only should be used.

(xii) If the carbon dioxide content of the stream is 16%, and the hydrogen sulfide content is 250 ppm, a combination membrane system should be used.

(xiii) If the carbon dioxide content of the stream is 25% and the hydrogen sulfide content is 10%, the more hydrogen-sulfide-selective membrane only should be used.

(xiv) If the carbon dioxide content of the stream is 25% and the hydrogen sulfide content is 50 ppm, the more carbon-dioxide-selective membrane only should be used.

(xv) If the carbon dioxide content of the stream is 25%, and the hydrogen sulfide content is 500 ppm, a combination membrane system should be used.

(xvi) If the carbon dioxide content of the stream is about 50–60% or more, the more hydrogen-sulfide-selective membrane should not be used alone, no matter how high the hydrogen sulfide content.

(xvii) If the carbon dioxide content of the stream is 40% and the hydrogen sulfide content is 120 ppm, the more carbon-dioxide selective membrane only should be used.

(xviii) If the carbon dioxide content of the stream is 40%, and the hydrogen sulfide content is 2,000 ppm, a combination membrane system should be used.

(xix) If the hydrogen sulfide content of the stream is about 600 ppm or more, the more carbon-dioxide-selective membrane should not be used alone, no matter how high the carbon dioxide content.

(xx) If the carbon dioxide content of the stream is 70%, a combination membrane system should always be used if the hydrogen sulfide content is above about 500 ppm.

The discussion of the zone diagram and the specific instances of what it teaches for twenty different gas compositions is deliberately fairly lengthy, so as to cover examples in the mid-ranges and near the edges of the bands and zones.

Another way to express the teachings of the invention is simply to define single limits for the carbon dioxide and hydrogen sulfide concentrations that are best treated by different types of membrane. This approach gives a less accurate result in any individual circumstance than the zone or band approaches, but gives a broad guide that is useful irrespective of the particular process attribute that is of most concern. Specifically:

1. If the carbon dioxide content of the stream is less than about 40% and the hydrogen sulfide content is more than about 6,000 ppm (1%), the more hydrogen-sulfide-selective membrane should be used.
2. If the carbon dioxide content of the stream is less than about 20% and the hydrogen sulfide content is more than about 500 ppm, the more hydrogen-sulfide-selective membrane should be used.
3. If the carbon dioxide content of the stream is less than about 10% and the hydrogen sulfide content is more than about 10 ppm, the more hydrogen-sulfide-selective membrane should be used.
4. If the hydrogen sulfide content of the stream is less than about 25 ppm and the carbon dioxide content is more than about 10%, the more carbon-dioxide-selective membrane only should be used.
5. If the hydrogen sulfide content of the stream is less than about 100 ppm and the carbon dioxide content is more than about 15%, the more carbon-dioxide-selective membrane only should be used.
6. If the carbon dioxide content of the stream is in the range about 5–20% carbon dioxide and the hydrogen sulfide content is in the range 10–1,000 ppm, a combination membrane system may be used.
7. If the carbon dioxide content of the stream is in the range about 10–25% carbon dioxide and the hydrogen sulfide content is in the range 50–5,000 ppm, a combination membrane system may be used.
8. If the carbon dioxide content of the stream is greater than about 25% carbon dioxide and the hydrogen sulfide content is greater than about 200 ppm, a combination membrane system may be used.
9. If the carbon dioxide content of the stream is greater than about 40% carbon dioxide and the hydrogen sulfide content is greater than about 600 ppm, a combination membrane system may be used.

If a combination of the two membrane types is to be used, the simplest configuration is to pass the gas stream first through modules containing the one membrane type, then to pass the residue stream from the first bank of modules through a second bank containing membranes of the other type. The order in which the membrane types are encountered by the gas stream can be chosen according to the specifics of the application. If the raw gas stream contains significant amounts of water and hydrogen sulfide, for example, it is preferable to use the more hydrogen-sulfide-selective membrane first, since cellulose acetate membranes have been shown to lose both selectivity and permeability substantially if exposed to combinations of water vapor and hydrogen sulfide. They also do not withstand relative humidities above about 30% very well. The polyamide-polyether block copolymer membranes that are preferred as the more hydrogen-sulfide-selective membrane, on the other hand, are not usually damaged by water or hydrogen sulfide, and can handle gas streams having high relative humidities, such as above 30% RH, above 90% RH and even saturation. Furthermore, the membranes are very permeable to water vapor, and so can be used to dehydrate the gas stream before it passes to the second bank of modules. If humidity and hydrogen sulfide content are not issues, and no other factors that affect only one of the membrane types are at work, then the total methane loss into the permeate streams and the total membrane area required to perform the separation should be essentially independent of the order in which the membranes are positioned.

Any membranes that can achieve the necessary carbon dioxide/methane selectivity and hydrogen sulfide/methane selectivity, plus commercially useful transmembrane fluxes, can be used. Preferably the membranes should be characterized by transmembrane methane fluxes of at least $1 \times 10^{-6}$ cm$^3$(STP)/cm$^2$.s.cmHg, most preferably by transmembrane methane fluxes of at least $1 \times 10^{-5}$ cm$^3$(STP)/cm$^2$.s.cmHg.

For the more carbon-dioxide-selective membrane, the preferred membranes are the cellulose acetate membranes that are already in use. Other candidates include different cellulose derivatives, such as ethylcellulose, methylcellulose, nitrocellulose and particularly other cellulose esters. Otherwise, membranes might be made from polysulfone, polyethersulfone, polyamides, polyimides, polyetherimides, polyacrylonitrile, polyvinylalcohol, other glassy materials or any other appropriate material. Usually, glassy materials have enough mechanical strength to be formed as integral asymmetric membranes, the production of which is well known in the art. The invention is not intended to be limited to any particular membrane material or membrane type, however, and encompasses any membrane, of any material, that is capable of meeting the target permeation properties, including, for example, homogeneous membranes, composite membranes, and membranes incorporating sorbents, carriers or plasticizers.

For the more hydrogen-sulfide-selective membrane, the most preferred membranes have hydrophilic, polar elastomeric selective layers. The mobility selectivity of such materials, although it favors hydrogen sulfide and carbon dioxide over methane, is modest compared to glassy materials. Because the membrane is hydrophilic and polar, however, the sorption selectivity strongly favors hydrogen sulfide, carbon dioxide and water vapor over non-polar hydrophobic gases such as hydrogen, methane, propane, butane, etc. Although the selectivity of such materials is affected by swelling in the presence of condensable components, we have discovered that hydrogen sulfide/methane selectivities of at least 30 or 35, sometimes at least 40 and sometimes 50, 60 or above can be maintained, even with gas mixtures containing high acid gas concentrations, even at high relative humidity, and even at very high feed pressures up to 500 psig, 800 psig, 1,000 psig or above. These are unusual and very useful properties. These properties render the membranes unusually suitable for treating natural gas, which often contains multiple components, has high humidity and is at high pressure. Preferred membrane materials exhibit water sorption greater than 5%, more preferably greater than 10%, when exposed to liquid water at room temperature. Particularly preferred are segmented or block copolymers that form two-domain structures, one domain being a soft, rubbery, hydrophilic region, the other being harder and glassy or more glassy. Without wishing to be bound by any particular theory of gas transport, we believe that the soft, rubbery domains provide a preferential pathway for the hydrogen sulfide and carbon dioxide components; the harder domains provide mechanical strength and prevent excessive swelling, and hence loss of selectivity, of the soft domains. Polyether blocks are preferred for forming the soft flexible domains; most preferably these blocks incorporate polyethylene glycol, polytetramethylene glycol or polypropylene glycol, to increase the sorption of polar molecules by the membrane material.

One specific example of the most preferred membrane materials that could be used for the more hydrogen-sulfide selective membrane is polyamide-polyether block copolymers having the general formula

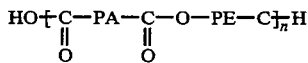

where PA is a polyamide segment, PE is a polyether segment and n is a positive integer. Such polymers are available commercially as Pebax® from Atochem Inc., Glen Rock, N.J. or as Vestamid® from Nuodex Inc., Piscataway, N.J. The polyamide block gives strength and is believed to prevent the membrane swelling excessively in the presence of water vapor and/or carbon dioxide.

Other specific examples include polyether- and polyester-based polyurethanes. Representative polymer formulations and recipes are given, for example, in U.S. Pat. No. 5,096,592, in which the copolymers are made by first preparing a prepolymer by combining simple diols and aliphatic or aromatic dicarboxylic acids with an excess of diacid to prepare diacid-terminated blocks, then chain-extending these with appropriately selected polypropylene or polyethylene glycol segments.

Usually, rubbery materials do not have enough mechanical strength to be formed as integral asymmetric membranes, but are instead incorporated into composite membranes, in which the rubbery selective layer is supported on a microporous substrate, often made from a glassy polymer. The preparation of composite membranes is also well known in the art. It is commonly thought that rubbery composite membranes do not withstand high-pressure operation well, and to date, such membranes have not been generally used in natural gas treatment, where feed gas pressures are often as high as 500 psig or 1,000 psig. We have found, however, that composite membranes, with thin enough rubbery selective layers to provide a transmembrane methane flux of at least $1 \times 10^{-6}$ cm$^3$(STP)/cm$^2$s.cmHg,can be used satisfactorily at high feed pressures and not only maintain their integrity but continue to exhibit high selectivity for hydrogen sulfide over methane.

In their most basic embodiments, the processes of the invention make use of a one-stage membrane design if a single membrane type is indicated, and a two-step membrane design, in which the residue from the first step becomes the feed for the second step, if a combination of membrane types is indicated. It will be apparent to those of ordinary skill in the art that more sophisticated embodiments are possible. For example, a two-stage (or more complicated) membrane configuration, in which the permeate from the first stage becomes the feed for the second, may be used to further enrich the acid gas content of the permeate stream and to reduce methane losses. It is envisaged that a two-stage membrane configuration, using like or unlike membrane types in the two stages will often be used. In such arrangements, the residue stream from the second stage may be recirculated for further treatment in the first stage, or may be passed to the gas pipeline, for example.

In one-stage configurations, the residue stream may also be subjected to further membrane treatment. Both permeate and residue streams may be subjected to additional non-membrane treatment, such as in an amine plant, to bring the residue stream to pipeline specification, for example. Given the diversity of flow rates, compositions and locations of natural gas wells, it is envisioned that the membrane separation process will often form part of a hybrid treatment scheme that delivers pipeline quality methane, on the one hand, and that concentrates and disposes of the acid-gas-laden waste stream, in an environmentally acceptable manner, on the other.

In the zone calculations, the target pipeline specification for the treated gas was assumed to be no more than about 2 vol % carbon dioxide and 4 ppm hydrogen sulfide, which is typical pipeline specification. However, depending on the destination of the gas and specific standards to which the gas is subject, it is believed that a carbon dioxide content below about 3 vol % and a hydrogen sulfide content below about 20 ppm will be acceptable in many situations.

The processes of the invention exhibit a number of advantages compared with previously available acid gas treatment technology. First, provision of a membrane with much higher selectivity for hydrogen sulfide over methane makes it possible, for the first time, to apply membrane treatment efficiently to gas streams characterized by relatively high concentrations of hydrogen sulfide compared to carbon dioxide. This expands the range of utility of membrane separation substantially. Since membrane systems are light, simple and low-maintenance compared with amine plants, the enhanced ability to use membranes as a treatment option facilitates the exploitation of gas fields off-shore or in remote locations. Secondly, the processes are much better at handling gas streams of high relative humidity, so that less pretreatment of the raw gas stream is necessary. Thirdly, it is sometimes possible to bring a natural gas stream into pipeline specifications for all three of carbon dioxide, hydrogen sulfide and water vapor with a single membrane treatment. This is a very important feature, which makes the processes of the invention clearly more attractive than using one process for dehydration, a second for carbon dioxide removal and a third for hydrogen sulfide removal. Fourthly, overprocessing of the gas stream by removing the carbon dioxide to a much greater extent than is actually necessary, simply to bring the hydrogen sulfide content down, can be avoided. Fifthly, much greater flexibility to adjust membrane operating and performance parameters is provided by the availability of two types of membranes. Sixthly, the process can be optimized for any chosen process attribute by calculating the appropriate membrane mix to use.

The invention is now further illustrated by the following examples, which are intended to be illustrative of the invention, but are not intended to limit the scope or underlying principles of the invention in any way.

EXAMPLES

The examples are in seven sets.

SET 1

Examples 1–10 are comparative examples that illustrate the performance of various glassy and rubbery polymers exposed to acid gases under a variety of conditions.

Example 1

Pure gas measurements. Polyimide membranes of two grades (a) A three-layer composite membrane was prepared, using a microporous polyvinylidene fluoride (PVDF) support layer. The support was first coated with a thin, high-flux, sealing layer, then with a selective layer of polyimide (Matrimid Grade 5218, Ciba-Geigy, Hawthorne, N.Y.). Membrane stamps were mounted in a test cell and the permeation properties of the membrane were tested with pure carbon dioxide and with pure methane at a feed pressure of 50 psig. The results are listed in Table 2.

(b) A three-layer composite membrane was prepared, using a microporous polyvinylidene fluoride (PVDF) support layer. The support was first coated with a thin, high-flux, sealing layer, then with a selective layer of polyimide (custom-made 6FDA-IPDA). Membrane stamps were mounted in a test cell and the permeation properties of the membrane were tested with pure carbon dioxide and with pure methane at a feed pressure of 50 psig. The results are listed in Table 2.

Example 2

Mixed gas measurements. Polyimide membranes of two grades (a) Three-layer composite membranes as in Example 1 (a) were tested with a gas mixture consisting of 800 ppm hydrogen sulfide, 4 vol % carbon dioxide, the balance methane. The feed pressure was 390 psig. The results are listed in Table 2.

(b) Three-layer composite membranes as in Example 1(b) were tested with a gas mixture consisting of 800 ppm hydrogen sulfide, 4 vol % carbon dioxide, the balance methane. Two feed pressures, 392 psig and 694 psig, were used. The results are listed in Table 2.

Example 3

Pure gas measurements. PTMSP membrane

A composite membrane was prepared by coating a polytrimethylsilylpropyne (PTMSP) layer onto a polyvinylidene fluoride (PVDF) support membrane. Membrane stamps were mounted in a test cell and the permeation properties of the membrane were tested with pure carbon dioxide and with pure methane at a feed pressure of 50 psig. The results are listed in Table 2.

Example 4

Mixed gas measurements. PTMSP membrane

Composite membranes as in Example 3 were tested with a gas mixture consisting of 800 ppm hydrogen sulfide, 4 vol % carbon dioxide, the balance methane. The feed pressure was 390 psig. The results are listed in Table 2.

Example 5

Pure gas measurements. Silicone rubber membrane

A composite membrane was prepared by coating a silicone rubber layer onto a microporous support membrane. Membrane stamps were mounted in a test cell and the permeation properties of the membrane were tested with pure carbon dioxide and with pure methane at a feed pressure of 50 psig. The results are listed in Table 2.

Example 6

Mixed gas measurements. Silicone rubber membrane

Composite membranes as in Example 5 were tested with a gas mixture consisting of 650 ppm hydrogen sulfide, 4 vol % carbon dioxide, the balance methane. The feed pressure was 95 psig. The results are listed in Table 2.

Example 7

Pure gas measurements. Polybutadiene membrane

A composite membrane was prepared by coating a polybutadiene (Scientific Polymer Products, Ontario, NY) layer onto a PVDF support membrane. Membrane stamps were mounted in a test cell and the permeation properties of the membrane were tested with pure carbon dioxide and with pure methane at a feed pressure of 50 psig. The results are listed in Table 2.

Example 8

Mixed gas measurements. Polybutadiene membrane

Composite membranes as in Example 7 were tested with a gas mixture consisting of 800 ppm hydrogen sulfide, 4 vol % carbon dioxide, the balance methane. The feed pressure was 394 psig. The results are listed in Table 2.

TABLE 2

Permeation Properties of Various Glassy and Rubbery Polymer Membranes

| Ex. # | Feed Pressure (psig) | Pressure Normalized Flux × 10⁶ [cm³(STP)/(cm·s·cmHg)] | | | Membrane Selectivity | |
|---|---|---|---|---|---|---|
| | | $H_2S$ | $CO_2$ | $CH_4$ | $H_2S/CH_4$ | $CO_2/CH_4$ |
| 1(a) (pure gas) | 50 | — | 23.0 | 1.23 | — | 18.7 |
| 2(a) (mixed gas) | 390 | 16.5 | 18.3 | 1.73 | 9.5 | 10.6 |
| 1(b) (pure gas) | 50 | — | 156 | 2.47 | — | 63.2 |
| 2(b) (mixed gas) | 392 | 25.1 | 51.5 | 2.40 | 10.5 | 21.4 |
| 2(b) (mixed gas) | 694 | 24.8 | 47.9 | 2.51 | 9.9 | 19.1 |
| 3 (pure gas) | 50 | — | 524 | 281 | — | 1.9 |
| 4 (mixed gas) | 390 | 101 | 72.4 | 30.6 | 3.3 | 2.4 |
| 5 (pure gas) | 50 | — | 41.4 | 10.7 | — | 3.9 |
| 6 (mixed gas) | 95 | 107 | 50.8 | 15.5 | 6.9 | 3.3 |
| 7 (pure gas) | 50 | — | 119 | 21.2 | — | 5.4 |
| 8 (mixed gas) | 394 | 298 | 110 | 35.6 | 8.4 | 3.1 |

The highest selectivity for hydrogen sulfide over methane was only 10.5, which was achieved with a polyimide membrane at about 400 psig feed pressure.

Example 9

Behavior of Cellulose Acetate Membranes in the Presence of Water Vapor

Figure 3:
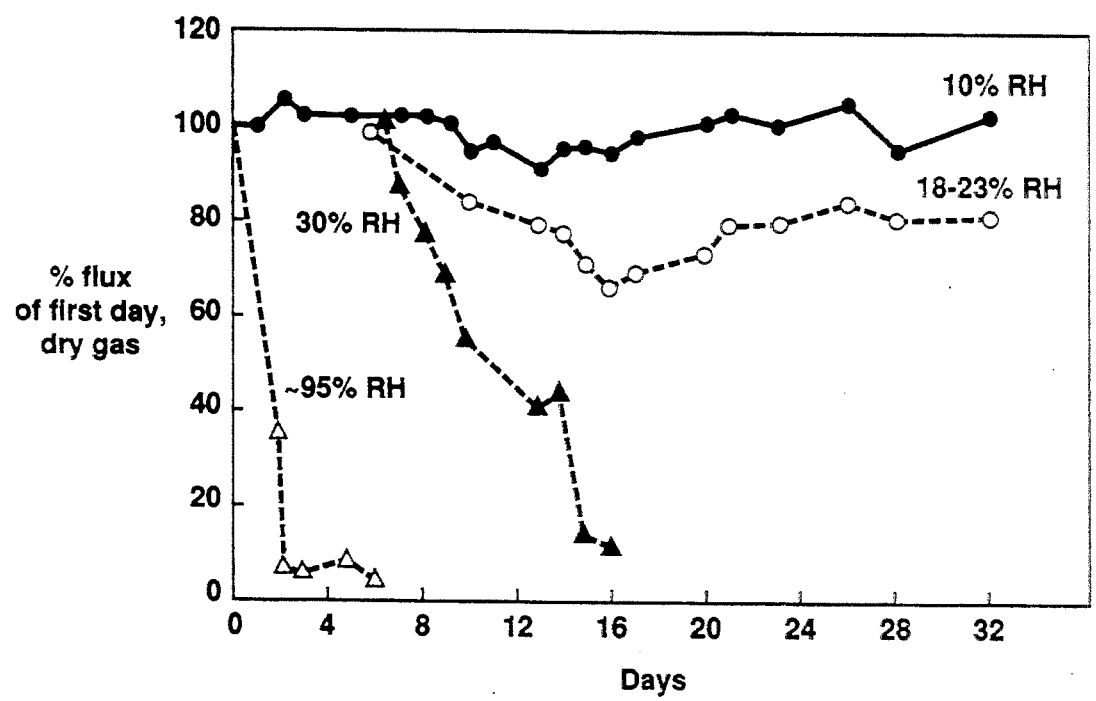
FIG. 3 is a graph showing the effect of water vapor on carbon dioxide flux through cellulose acetate membranes.

This comparative example is from the report by N. N. Li et al. to the Department of Energy ("Membrane Separation Processes in the Petrochemical Industry, Phase II Final Report, September 1987). Li et al. examined the effect of water vapor in a feed gas stream of carbon dioxide on transmembrane flux. FIG. 3, taken from the report summarizes their data. For relative humidity of 10% or less, there is no appreciable effect on the carbon dioxide flux. For relative humidities in the range 18–23%, the flux decreased 30% compared to the dry gas flux, but recovered when the feed was switched back to dry gas. For relative humidities of 30% and higher, the flux decline was found to be large, rapid and irreversible.

Example 10

Figure 4:
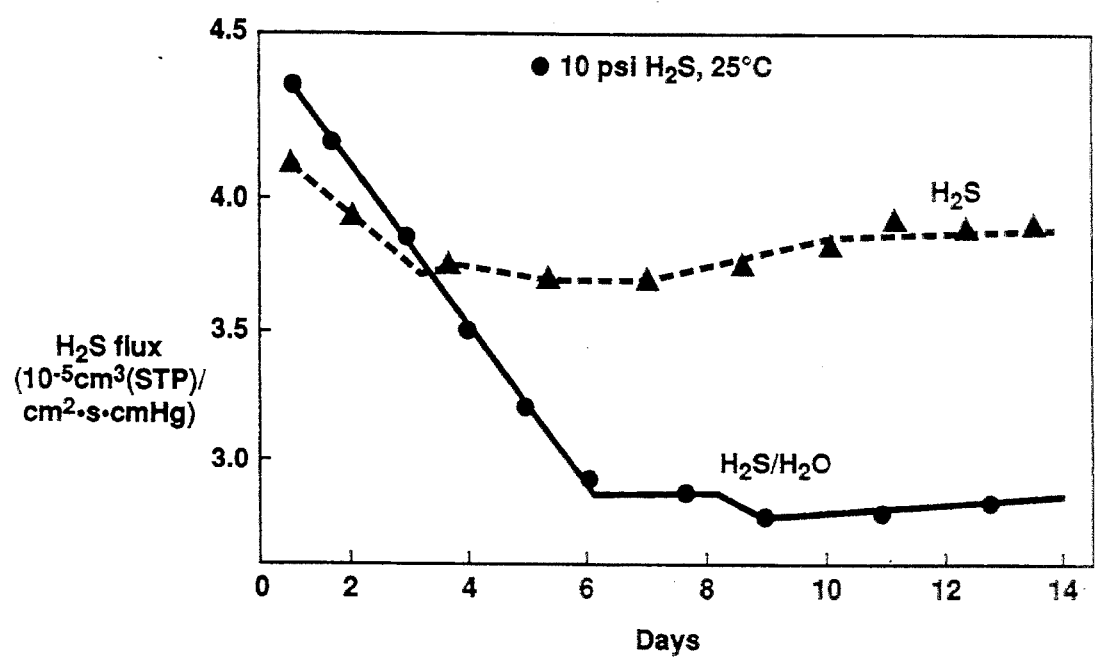
FIG. 4 is a graph showing the effects of hydrogen sulfide and water vapor on the performance of cellulose acetate membranes.

Behavior of Cellulose Acetate Membranes in the Presence of Hydrogen Sulfide and Water Vapor This example is also taken from the Li et al. report. FIG. 4 summarizes the data. Hydrogen sulfide has a negligible effect on membrane performance if the feed gas is dry. If both hydrogen sulfide and water vapor are present, however, the transmembrane flux is substantially reduced. Li et al. conclude that the processing of streams containing both high concentrations of hydrogen sulfide and water vapor must be avoided with cellulose acetate membranes.

SET 2

Examples 11 and 12 show the performance of polyamide-polyether membranes exposed to pure gases. These examples are from earlier work at Membrane Technology and Research, as already reported in U.S. Pat. No. 4,963,165, since we were not able to make measurements with pure hydrogen sulfide.

Example 11

Polyamide-polyether membranes. Pure gas data

A multilayer composite membrane was prepared by coating a polysulfone support membrane first with a thin high-flux, sealing layer, then with a 1 wt % solution of Pebax grade 4011 in i-butanol. The membrane was tested with pure gases at a temperature of 20° C. and a feed pressure of 50 psig. The results are shown in Table 3.

Example 12

Polyamide-polyether membranes. Pure gas data

A second membrane was prepared using the same materials and technique as in Example 11. The results of pure gas tests with this membrane are also shown in Table 3. There is good agreement between the sets of results from Examples 11 and 12.

TABLE 3

Permeation Properties of Pebax 4011 Composite Membranes Tested with Pure Gases

| Ex. # | Feed Pressure (psig) | Pressure Normalized Flux × 10⁶ [cm³(STP)/(cm·s·cmHg)] | | | Membrane Selectivity | |
|---|---|---|---|---|---|---|
| | | $H_2S$ | $CO_2$ | $CH_4$ | $H_2S/CH_4$ | $CO_2/CH_4$ |
| 11 | 50 | 1,650 | 219 | 11.9 | 139 | 18 |
| 12 | 50 | 1,750 | 185 | 9.19 | 190 | 20 |

Examples 13–18 show the performance of polyamide-polyether membranes exposed to gas mixtures under a variety of conditions.

Example 13

A composite membrane was prepared by coating a layer of a polyamidepolyether copolymer (Pebax grade 4011) onto a polyvinylidene fluoride (PVDF) support membrane using the same general techniques as in Example 11. The membrane was tested with a two-component gas mixture containing 4 vol % carbon dioxide, 96 vol % methane at three different feed pressures: 392 psig, 589 psig and 960 psig. In all cases the permeate side of the membrane was at, or close to, atmospheric pressure and the membrane was at room temperature (23° C.). The permeation results are listed in Table 4.

Example 14

The same type of membrane as in Example 13 was prepared and tested with a two-component gas mixture consisting of 970 ppm hydrogen sulfide, 99.9 vol % methane at three different feed pressures: 388 psig, 588 psig and 970 psig. In all cases the permeate side of the membrane was at, or close to, atmospheric pressure and the membrane was at room temperature (23° C.). The permeation results are listed in Table 4.

Example 15

The same type of membrane as in Example 13 was prepared and tested with a three-component gas mixture consisting of 870 ppm hydrogen sulfide, 4.12 vol % carbon dioxide and 95.79 vol % methane at three different feed pressures: 386 psig, 589 psig and 974 psig. In all cases the permeate side of the membrane was at, or close to, atmospheric pressure and the membrane was at room temperature (23° C.). The permeation results are listed in Table 4.

Example 16

The same type of membrane as in Example 13 was prepared and tested with a three-component gas mixture consisting of 0.986 vol % hydrogen sulfide, 4.12 vol % carbon dioxide and 94.90 vol % methane at three different feed pressures: 389 psig, 586 psig and 971 psig. In all cases the permeate side of the membrane was at, or close to, atmospheric pressure and the membrane was at room temperature (23° C.). The permeation results are listed in Table 4.

Example 17

The same type of membrane as in Example 13 was prepared and tested with a three-component gas mixture consisting of 1.83 vol % hydrogen sulfide, 10.8 vol % carbon dioxide and 87.34 vol % methane at a feed pressure of 965 psig. The permeate side of the membrane was at, or dose to, atmospheric pressure and the membrane was at room temperature (23° C.). The permeation results are listed in Table 4.

Example 18

The same type of membrane as in Example 13 was prepared and tested with a three-component gas mixture consisting of 950 ppm hydrogen sulfide, 8.14 vol % carbon dioxide and 91.77 vol % methane at three different feed pressures: 391 psig, 585 psig and 970 psig. In all cases the permeate side of the membrane was at, or dose to, atmospheric pressure and the membrane was at room temperature (23° C.). The permeation results are listed in Table 4.

TABLE 4

Permeation Properties of a Pebax ® 4011 Composite Membrane with Various Feed Gas Compositions at Three Feed Pressures

| Ex. # | Feed Pressure (psig) | Pressure Normalized Flux × 10$^6$ [cm$^3$(STP)/ (cm · s · cmHg)] | | | Membrane Selectivity | |
|---|---|---|---|---|---|---|
| | | $H_2S$ | $CO_2$ | $CH_4$ | $H_2S$/ $CH_4$ | $CO_2$/ $CH_4$ |
| 13 | 392 | — | 31 | 1.9 | — | 17 |
| | 589 | — | 30 | 1.9 | — | 16 |
| | 960 | — | 29 | 2.0 | — | 15 |
| 14 | 388 | 91 | — | 1.8 | 51 | — |
| | 588 | 74 | — | 1.8 | 41 | — |
| | 970 | 73 | — | 1.8 | 41 | — |
| 15 | 386 | 140 | 31 | 1.9 | 70 | 16 |
| | 589 | 115 | 30 | 2.0 | 56 | 15 |
| | 974 | 110 | 29 | 2.2 | 52 | 14 |
| 16 | 389 | 113 | 32 | 2.0 | 55 | 16 |
| | 586 | 103 | 31 | 2.0 | 51 | 15 |
| | 971 | 97 | 29 | 2.0 | 48 | 14 |
| 17 | 965 | 121 | 34 | 2.4 | 50 | 14 |
| 18 | 391 | 93 | 26 | 1.6 | 58 | 16 |
| | 585 | 108 | 32 | 2.0 | 52 | 15 |
| | 970 | 93 | 28 | 1.9 | 48 | 14 |

The following observations can be made from the data of Examples 13-18:

1. The presence of carbon dioxide in the feed gas appears to increase the fluxes of both hydrogen sulfide and methane through the membrane. For example, a comparison of the results of Example 14, in which the feed mixture did not contain any carbon dioxide, with those of Examples 15-18, shows that the hydrogen sulfide fluxes are about 25% lower and the methane fluxes are about 15% lower in Example 14. The increased flux may be due to swelling of the membrane by dissolved carbon dioxide.

2. In general, the pressure-normalized fluxes of hydrogen sulfide and carbon dioxide decrease with increasing feed pressure, whereas those of methane increase. The decrease in the hydrogen sulfide and carbon dioxide fluxes may be due to competitive sorption, which results in a lower solubility coefficient (the ratio of concentration in the polymer to partial pressure) for each component. At the same time, the polymer swells, resulting in a higher diffusivity for all components, including methane. The net result is an increase in the methane flux and a decrease in the fluxes of the acid gases (hydrogen sulfide and carbon dioxide).

3. The hydrogen sulfide/methane selectivity for three-component mixtures varies from a low of 48 to a high of 70, although all of the measurements were made at fairly high feed pressures. The carbon dioxide/methane selectivity, also at high pressure, is about 14-16.

Example 19

Gas streams containing water vapor

The experiments of Example 15 were repeated using feed gas streams saturated with water vapor by bubbling the feed gas through a water reservoir. The experiments were carried out at feed pressures of 387 psig, 588 psig and 970 psig. The permeate side of the membrane was at, or close to, atmospheric pressure and the membrane was at room temperature (23° C.). The permeation results are listed in Table 5.

TABLE 5

Permeation Properties of Pebax 4011 Composite Membranes Tested with Water-Saturated Gas Mixtures

| Ex. # | Feed Pressure (psig) | Pressure Normalized Flux × 10$^6$ [cm$^3$(STP)/ (cm · s · cmHg)] | | | Membrane Selectivity | |
|---|---|---|---|---|---|---|
| | | $H_2S$ | $CO_2$ | $CH_4$ | $H_2S$/ $CH_4$ | $CO_2$/ $CH_4$ |
| 19 | 387 | 77.0 | 18.9 | 1.03 | 74.9 | 18.4 |
| | 588 | 73.5 | 20.1 | 1.20 | 61.4 | 16.9 |
| | 970 | 68.6 | 18.1 | 1.17 | 58.8 | 15.5 |

Comparing these results with those of Table 4, it can be seen that the fluxes are considerably lower (about 40-45% lower) than those obtained in the absence of water vapor. Neither the hydrogen sulfide/methane nor the carbon dioxide/methane selectivities, however, change significantly. Furthermore, when the membranes were retested with a dry gas stream, the fluxes returned to the original values.

SET 3

Examples 20-25 show typical computer calculations used to prepare a zone diagram. These calculations, and others of the same type, were used to prepare the zone diagram of FIG. 1, which shows feed gas carbon dioxide concentration on one axis and hydrogen sulfide concentration on the other. The diagram was prepared by running a series of membrane separation computer simulations for hypothetical three-component (methane, carbon dioxide, hydrogen sulfide) gas streams of particular flow rates and compositions at a feed pressure of 1,000 psia. In all cases, the target was to bring the stream to a pipeline specification of 4 ppm hydrogen sulfide and 2% carbon dioxide. The membrane properties were assumed to be as follows:

| More $CO_2$-selective membrane | |
|---|---|
| Carbon dioxide/methane selectivity: | 20 |
| Hydrogen sulfide/methane selectivity: | 25 |
| Methane flux: | 7.5 × 10$^{-6}$ cm$^3$(STP)/ cm$^2$ · s · cmHg |
| More $H_2S$-selective membrane: | |
| Carbon dioxide/methane selectivity: | 13 |
| Hydrogen sulfide/methane selectivity: | 50 |
| Methane flux: | 7.5 × 10$^{-6}$ cm$^3$(STP)/ |

-continued cm² · s · cmHg

In each case, the methane loss into the permeate stream that would occur if a one-stage membrane separation process were to be carried out was calculated, and was used to define zones of least methane loss.

Example 20

A computer calculation was carried out for a feed stream of composition 200 ppm hydrogen sulfide, 15 vol % carbon dioxide, the remainder methane. Four simulations were performed: (i) using only the more hydrogen-sulfide-selective membrane (membrane A), (ii) using only the more carbon-dioxide-selective membrane (membrane B), (iii) using a combination of the more hydrogen-sulfide-selective membrane followed by the more carbon-dioxide-selective membrane (A+B), and (iv) using a combination of the more carbon-dioxide-selective membrane followed by the more hydrogen-sulfide-selective membrane (B+A). The results are listed in Table 6.

TABLE 6

| Membrane type | Membrane area (m²) | Methane loss (%) | Residue $H_2S$ conc. (ppm) | Residue $CO_2$ conc. (vol %) |
|---|---|---|---|---|
| A | 203 | 18.1 | <0.1 | 2.0 |
| B | 204 | 18.6 | 4 | 0.6 |
| A + B | 160 | 14.3 | 4 | 2.0 |
| B + A | 160 | 14.3 | 4 | 2.0 |

The methane losses in all cases are high, because the process design was kept to a simple one-stage design for comparison purposes. The goal of this calculation was not to design a fully optimized process, but to determine which of the possible membrane types would be preferred. It is apparent from the table that a combination of the two membrane types would be indicated for treating a stream of this composition.

Example 21

A computer calculation was performed as in Example 20, using a feed stream of composition 70 ppm hydrogen sulfide, 10 vol % carbon dioxide, the remainder methane. The results are listed in Table 7.

TABLE 7

| Membrane type | Membrane area (m²) | Methane loss (%) | Residue $H_2S$ conc. (ppm) | Residue $CO_2$ conc. (vol %) |
|---|---|---|---|---|
| A | 171 | 14.7 | <0.1 | 2.0 |
| B | 161 | 14.0 | 4 | 1.0 |
| A + B | 130 | 11.5 | 4 | 2.0 |
| B + A | 130 | 11.5 | 4 | 2.0 |

Example 22

By repeating sets of calculations as shown in Examples 21 and 22, the boundary line between zones C and D, based on the stated assumptions as to membrane performance and operating conditions, was determined to be as follows:

| $CO_2$ content of feed gas (vol %) | $H_2S$ content of feed gas (ppm) |
|---|---|
| 2 | 4 |
| 3 | 6 |
| 5 | 12 |
| 10 | 29 |
| 20 | 70 |
| 30 | 120 |

Example 23

Calculations similar to those described in Example 22 were carried out to determine the position of the boundary line between zones D and B. The position of the boundary was determined to be as follows:

| $CO_2$ content of feed gas (vol %) | $H_2S$ content of feed gas (ppm) |
|---|---|
| 2 | 4 |
| 3 | 15 |
| 5 | 75 |
| 10 | 700 |
| 20 | 13,000 |
| 30 | 120,000 |

Example 24

The calculations of Example 23 were repeated to show the effect of higher or lower selectivity on the zone boundaries. Representative calculations were performed assuming a hydrogen sulfide/methane selectivity of the more hydrogen-sulfide-selective membrane of 30, 40 or 50, and a carbon dioxide/methane selectivity of the more hydrogen-sulfide-selective membrane of 10, 13 or 15. The results are plotted graphically in FIGS. 9 and 10. As can be seen, the Zone B/D boundary moves to the right as the ability of the membrane to separate carbon dioxide improves. Likewise, the boundary moves to the right as the selectivity for hydrogen sulfide over methane decreases. Although the area where the more hydrogen-sulfide-selective membranes should be used is larger at lower hydrogen sulfide/methane selectivity, the methane losses encountered in using the membrane will be greater.

Example 25

Figure 11:
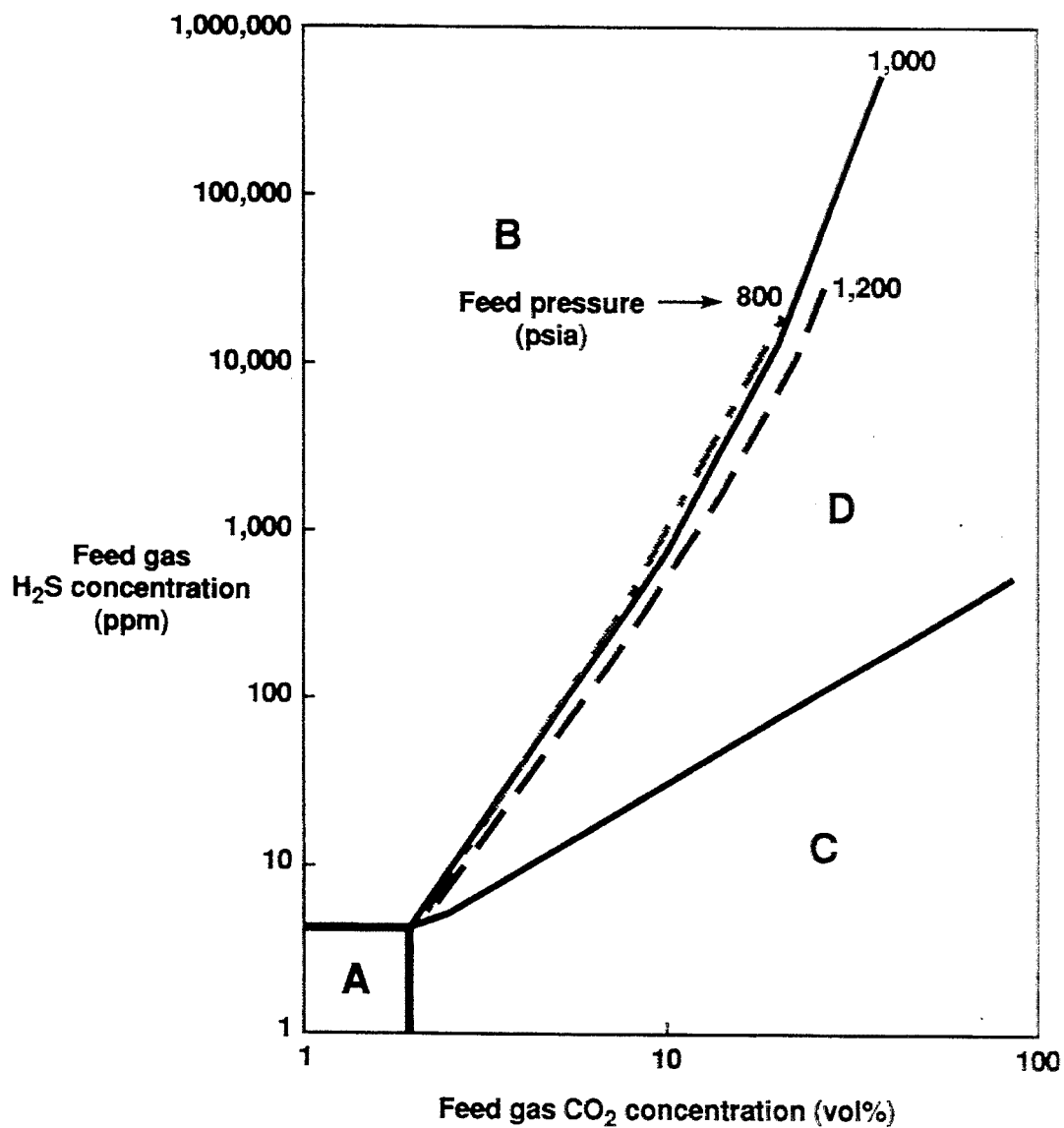
FIG. 11 is a diagram showing zones in which particular membranes should be used to separate hydrogen sulfide and carbon dioxide from methane, for different feed gas pressures.

The calculations of Example 23 were repeated assuming different values for the feed pressure. Representative calculations were performed assuming a feed pressure of 800, 1,000 or 1,200 psia. The results are plotted graphically in FIG. 11. As can be seen, the zone boundary is relatively insensitive to changes in the feed pressure.

SET 4

Examples 26–29 show representative processes using the more hydrogen-sulfide-selective membrane only.

Example 26

Figure 2:
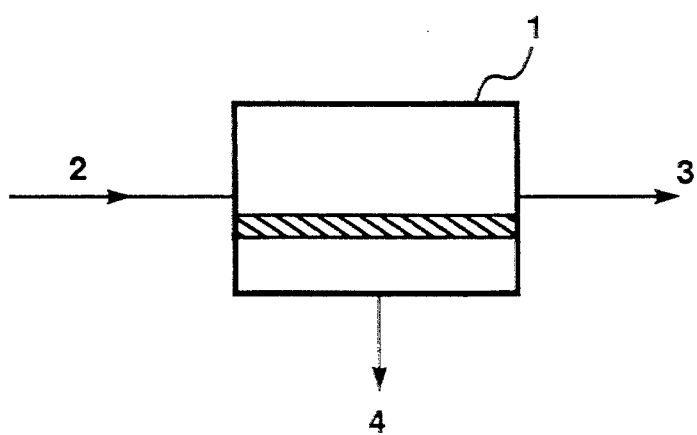
FIG. 2 is a basic schematic drawing of a one-stage membrane separation process.

A very simple one-stage membrane process was designed to handle a gas stream containing 100 ppm hydrogen sulfide, 0.1 vol % water vapor, 4 vol % carbon dioxide and the remainder methane, at a feed pressure of 1,000 psia. A basic schematic of the process is shown in FIG. 2, where numeral 1 indicates the bank of membrane modules, and the feed, residue and permeate streams are indicated by numerals 2, 3 and 4 respectively. The process was assumed to use one bank of more hydrogen-sulfide-selective membranes having the following characteristics:

| | |
|---|---|
| Hydrogen sulfide/methane selectivity: | 80 |
| Water vapor/methane selectivity: | 1,000 |
| Carbon dioxide/methane selectivity: | 12 |
| Methane flux: | $1 \times 10^{-6}$ cm$^3$(STP)/ cm$^2 \cdot$ s $\cdot$ cmHg |

The compositions and flow rates of the permeate and residue streams were calculated and are given in Table 8.

TABLE 8

| STREAM | FEED | RESIDUE | PERMEATE |
|---|---|---|---|
| Flow rate (scfm) | 1,000 | 903 | 97 |
| CH$_4$ conc. (vol %) | 95.9 | 98.1 | 75.6 |
| CO$_2$ conc. (vol %) | 4.0 | 1.9 | 23.2 |
| H$_2$S conc. (ppm) | 100 | 4 | 995 |
| Water vapor conc. (vol %) | 0.1 | 2 ppm | 1.0 |

The membrane area used to perform such a separation was calculated to be about 70 m$^2$. The stage cut was just under 10% and the methane loss into the permeate was 7.5%. The process produces a residue stream that simultaneously meets pipeline specification for carbon dioxide, hydrogen sulfide and water vapor. The low grade permeate gas could be sent to the foul gas line.

Example 27

The simple design of Example 26 is only possible for certain cases where the raw stream to be treated contains an appropriate balance of hydrogen sulfide and carbon dioxide. In many cases, a more complicated, optimized design is needed to improve the methane recovery and meet pipeline specifications without overprocessing.

Figure 5:
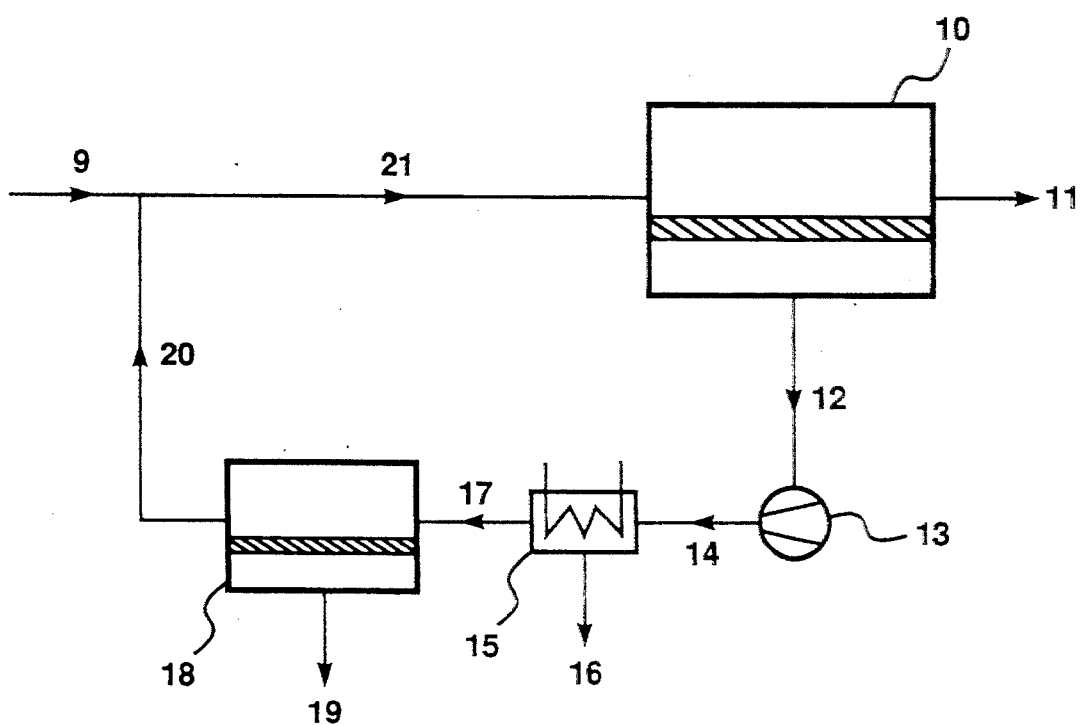
FIG. 5 is a basic schematic drawing of a typical two-stage membrane separation process.

A process was designed to handle a 1,000 scfm gas stream containing 1,000 ppm hydrogen sulfide, 0.1 vol % water vapor and the remainder methane, so as to keep methane loss in the permeate stream below 2%. The process uses a two-stage membrane separation system in which the permeate from the first bank of membrane modules becomes the feed for the second bank. A basic schematic of the process is shown in FIG. 5, where numeral 10 indicates the first stage bank of membrane modules and numeral 18 indicates the second stage bank of membrane modules. The incoming gas stream 9 is at 1,000 psia and is mixed with the residue stream 20 from the second stage to form the feed gas stream 21 to the first membrane stage. The permeate stream 12 from the first stage is recompressed to 1,000 psia in compressor 13. The compressed stream 14 passes to chiller 15, where water vapor is condensed and water is removed as liquid stream 16. The non-condensed stream 17 enters the second membrane stage 18, where further separation of hydrogen sulfide takes place. The residue stream from this stage is recirculated within the process. Both membrane stages were assumed to use more hydrogen-sulfide-selective membranes having the following characteristics:

| | |
|---|---|
| Hydrogen sulfide/methane selectivity: | 50 |
| Water vapor/methane selectivity: | 1,000 |

| | |
|---|---|
| -continued | |
| Methane flux: | $7.5 \times 10^{-6}$ cm$^3$(STP)/ cm$^2 \cdot$ s $\cdot$ cmHg |

The compositions and flow rates of the first and second stage permeate and residue streams were calculated and are given in Table 9.

TABLE 9

| STREAM | FEED | RESIDUE | PERMEATE |
|---|---|---|---|
| FIRST STAGE | | | |
| Flow rate (scfm) | 1,200 | 985 | 215 |
| CH$_4$ conc. (vol %) | 99.82 | 99.99 | 98.99 |
| Water vapor conc. (vol %) | 0.08 | 0.0 | 0.45 |
| H$_2$S conc. (vol %) | 0.10 | 4 ppm | 0.55 |
| SECOND STAGE | | | |
| Flow rate (scfm) | 215 | 202 | 13 |
| CH$_4$ conc. (vol %) | 99.42 | 99.89 | 92.12 |
| Water vapor conc. (ppm) | 330 | 21 | 5,015 |
| H$_2$S conc. (vol %) | 0.55 | 0.1 | 7.4 |

The membrane area used to perform such a separation was calculated to be about 280 m$^2$ total, 265 m$^2$ in the first stage and 15 m$^2$ in the second stage. The residue stream 11 from the first stage meets pipeline specifications. The permeate stream 19 from the second stage contains a high enough concentration of hydrogen sulfide to be passed to a Claus plant for sulfur recovery unit, or to a liquid redox process, such as LO-CAT, Sulferox, Hyperion or Stretford. The overall methane loss into the second stage permeate is very low, at just about 1%.

Example 28

A process was designed to handle a 1,000 scfm gas stream containing 1,000 ppm hydrogen sulfide, 4 vol % carbon dioxide and the remainder methane. The process uses a two-stage membrane separation system in which the permeate from the first bank of membrane modules becomes the feed for the second bank. The process schematic is as shown in FIG. 5, except that no condenser 15 is used. Numeral 10 indicates the first stage bank of membrane modules and numeral 18 indicates the second stage bank of membrane modules. The incoming gas stream 9 is at 1,000 psia and is mixed with the residue stream 20 from the second stage to form the feed gas stream 21 to the first membrane stage. In this case, the permeate stream 12 from the first stage is recompressed to 1,000 psia in compressor 13, then passed without any condensation taking place as compressed stream 17 to the second membrane stage 18, where further separation of hydrogen sulfide takes place. The residue stream from this stage is recirculated within the process. Both membrane stages were assumed to use more hydrogen-sulfide-selective membranes having the following characteristics:

| | |
|---|---|
| Hydrogen sulfide/methane selectivity: | 50 |
| Carbon dioxide/methane selectivity: | 13 |
| Methane flux: | $7.5 \times 10^{-6}$ cm$^3$(STP)/ cm$^2 \cdot$ s $\cdot$ cmHg |

The compositions of the first and second stage permeate and residue streams were calculated and are given in Table 10.

TABLE 10

| STREAM | FEED | RESIDUE | PERMEATE |
|---|---|---|---|
| FIRST STAGE | | | |
| Flow rate (scfm) | 1,220 | 964 | 256 |
| $CH_4$ conc. (vol %) | 93.0 | 98.86 | 71.8 |
| $CO_2$ conc. (vol %) | 6.9 | 1.14 | 28.3 |
| $H_2S$ conc. (ppm) | 1,000 | 4 | 4,733 |
| SECOND STAGE | | | |
| Flow rate (scfm) | 256 | 220 | 36 |
| $CH_4$ conc. (vol %) | 71.8 | 80.0 | 19.6 |
| $CO_2$ conc. (vol %) | 28.3 | 19.9 | 77.7 |
| $H_2S$ conc. (vol %) | 0.47 | 0.1 | 2.7 |

The membrane area used to perform such a separation was calculated to be about 244 $m^2$ total, 232 $m^2$ in the first stage and 12 $m^2$ in the second stage. The residue stream 11 from the first stage meets pipeline specifications. The permeate stream 19 from the second stage contains a high enough concentration of hydrogen sulfide to be passed to a Claus plant for sulfur recovery unit, or to a liquid redox process, such as LO-CAT, Sulferox, Hyperion or Stretford. The overall methane loss into the second stage permeate is very low, at about 0.7%.

Example 29

The calculations of Example 28 were repeated with a 1,000 scfm gas stream containing 10,000 ppm hydrogen sulfide, 4 vol % carbon dioxide and the remainder methane. The results are given in Table 11.

TABLE 11

| STREAM | FEED | RESIDUE | PERMEATE |
|---|---|---|---|
| FIRST STAGE | | | |
| Flow rate (scfm) | 1,330 | 950 | 380 |
| $CH_4$ conc. (vol %) | 91.0 | 99.4 | 70.0 |
| $CO_2$ conc. (vol %) | 8.0 | 0.6 | 26.5 |
| $H_2S$ conc. (ppm) | 10,000 | 4 | 3.5 vol % |
| SECOND STAGE | | | |
| Flow rate (scfm) | 380 | 330 | 50 |
| $CH_4$ conc. (vol %) | 70.0 | 78.6 | 16.2 |
| $CO_2$ conc. (vol %) | 26.5 | 20.4 | 64.6 |
| $H_2S$ conc. (vol %) | 3.5 | 1.0 | 19.2 |

The membrane area used to perform such a separation was calculated to be about 353 $m^2$ total, 339 $m^2$ in the first stage and 14 $m^2$ in the second stage. The residue stream 11 from the first stage meets pipeline specifications. The permeate stream 19 from the second stage contains a very high hydrogen sulfide concentration. The methane loss is less than 1%.

Examples 27-29 illustrate the benefits of two-stage processes in both reducing methane loss and raising the hydrogen sulfide concentration of the waste stream. In Examples 27-29, the feed composition, both raw and after mixing with recycle stream 20, is in zone B.

Example 30

Figure 8:
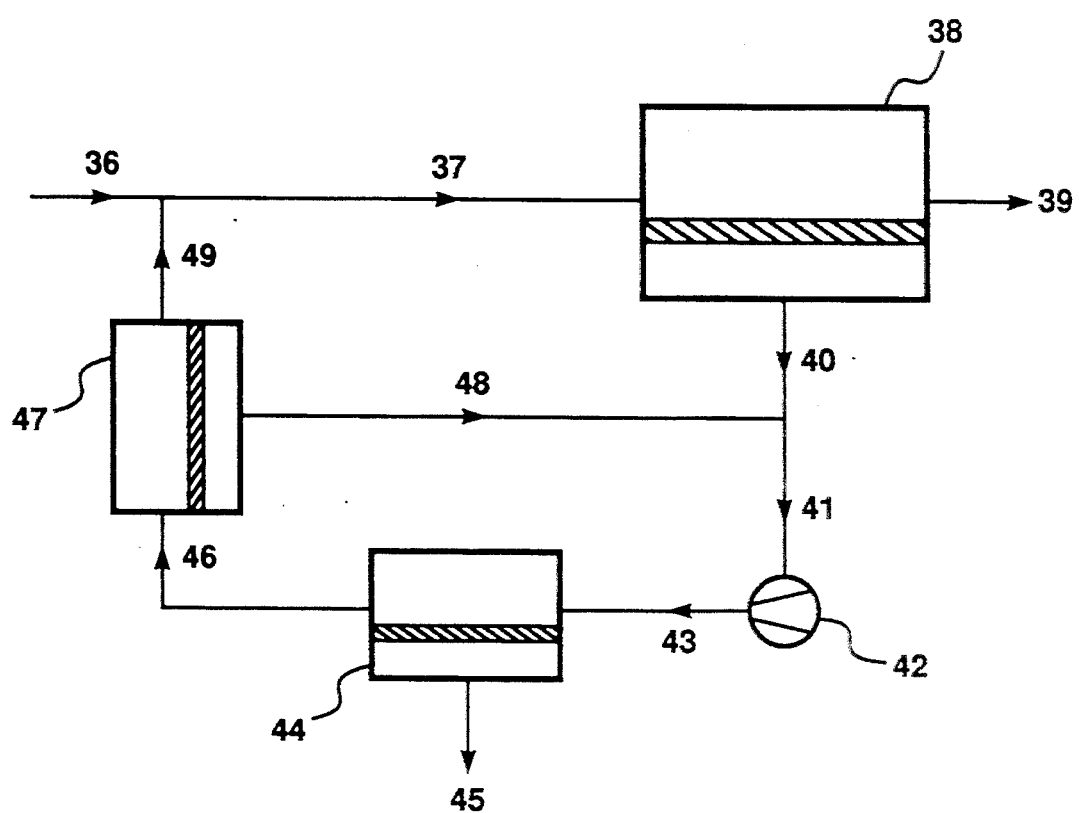
FIG. 8 is a basic schematic drawing of a two-stage membrane separation process with an auxiliary membrane unit forming a second-stage loop.

A process was designed to handle a 1,000 scfm gas stream containing 1,000 ppm hydrogen sulfide, the remainder methane. The process uses a membrane separation system as shown in FIG. 8. Numerals 38, 44 and 47 indicate the three banks of membrane modules: all contain the more hydrogen-sulfide-selective membrane. The incoming gas stream 36 is at 1,000 psia and is mixed with the residue stream 49 from module(s) 47 to form the feed gas stream 37 to the first membrane stage. The permeate stream, 40, from the first stage is recompressed in compressor 42. Compressor 42 drives two membrane units, the second stage unit, 44, and an auxiliary module or set of modules, 47, that are connected on the permeate side either directly or indirectly to the inlet side of the compressor, so as to form a loop. Thus, permeate stream 48 may be merged with permeate stream 40 to form combined stream 41. The recompressed, combined stream, 43, passes as feed to membrane unit 44, and the residue stream, 46, from membrane unit 44 passes as feed to membrane unit 47. Permeate is withdrawn from the loop as stream 45 and the treated residue exits as stream 39. This system configuration is particularly useful in situations where the hydrogen sulfide content of the raw stream is relatively low, yet flaring is not an option and the stream has to be brought up to a viable concentration for sulfur recovery. A series of calculations was carried out by keeping the area of membrane unit 38 constant, but varying the relative areas of membrane units 44 and 47. The characteristics of the membrane were assumed to be as in Example 28. The results of the calculations are given in Table 12.

TABLE 12

| Membrane Area ($m^2$) | | | | Permeate conc. |
|---|---|---|---|---|
| Unit 38 | Unit 44 | Unit 47 | Total | (vol %) |
| 242 | 0 | 18 | 260 | 2.65 |
| 242 | 10 | 11 | 263 | 4.26 |
| 242 | 15 | 8 | 265 | 5.77 |
| 242 | 20 | 6 | 268 | 8.92 |
| 242 | 35 | 2 | 279 | 19.7 |
| 242 | 50 | 0.4 | 292.4 | 55.0 |

The residue stream 39 from the first stage meets pipeline specifications. A high concentration of hydrogen sulfide in the waste permeate stream can be achieved with an appropriate choice of membrane areas.

This type of design could also be used in situations where combinations of the two membrane types are indicated.

SET 5

Examples 31-34 deal with streams in which the feed composition is in zone D, so that a combination of membrane types is indicated.

Example 31

Figure 7:
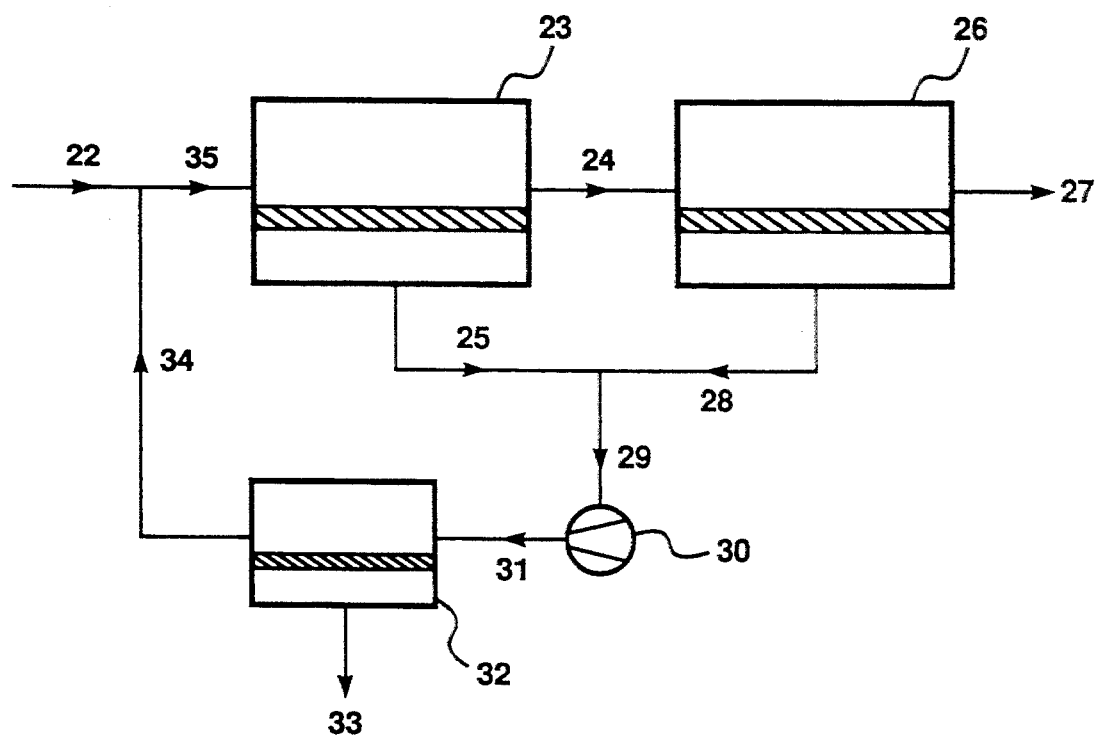
FIG. 7 is a basic schematic drawing of a two-step/two-stage membrane separation process.

A process was designed to handle a 1,000 scfm gas stream containing 60 ppm hydrogen sulfide, 15 vol % carbon dioxide and the remainder methane, a composition that falls in Zone D of FIG. 1, but close to the boundary between zones C and D. The process uses a membrane separation system as shown in FIG. 7. Numerals 23, 26 and 32 indicate the three banks of membrane modules; 23 contains the more hydrogen-sulfide-selective membrane; 26 and 32 contain the more carbondioxide-selective membrane. The incoming gas stream 22 is at 1,000 psia and is mixed with the residue stream 34 from the second stage to form the feed gas stream 35 to the first membrane stage. The residue stream, 24, from the first bank of modules passes as feed to the second bank of the first stage, 26. In this case, the permeate streams 25 and 28 from the two steps of the first stage are combined as stream 29 to be recompressed in compressor 30, then passed as compressed stream 31 to the second membrane stage 32. It will be apparent to those of ordinary skill in the art that two separate compressors could be used and the stream combined after compression. Also, in cases where the stream to be treated contains water vapor, the system could include a condenser as in FIG. 5 to condense permeating water vapor. The composition of stream 31 was in Zone C, so that the more carbon-dioxide-selective membrane was chosen for the second stage. The characteristics of the two types of membrane were assumed to be as follows:

More hydrogen-sulfide-selective membrane:
Hydrogen sulfide/methane selectivity: 50
Carbon dioxide/methane selectivity: 13
Methane flux: $7.5 \times 10^{-6} \, cm^3(STP)/cm^2 \cdot s \cdot cmHg$ More carbon-dioxide-selective membrane:
Hydrogen sulfide/methane selectivity: 25
Carbon dioxide/methane selectivity: 20
Methane flux: $7.5 \times 10^{-6} \, cm^3(STP)/cm^2 \cdot s \cdot cmHg$ The compositions of the various streams were calculated and are given in Table 13.

TABLE 13

| Stream # | $CH_4$ conc. (vol %) | $H_2S$ conc. (ppm) | $CO_2$ conc. (vol %) |
|---|---|---|---|
| 22 | 85.0 | 60 | 15.0 |
| 35 | 84.0 | 60 | 16.0 |
| 24 | 90.2 | 10 | 9.8 |
| 27 | 98.0 | 1 | 2.0 |
| 25 | 36.1 | 456 | 63.9 |
| 28 | 52.3 | 51 | 47.7 |
| 31 | 45.5 | 223 | 54.5 |
| 33 | 7.5 | 407 | 92.5 |
| 34 | 78.6 | 60 | 21.4 |

The membrane areas required were as follows: 66 m² for membrane 23, 120 m² for membrane 26 and 22 m² for membrane 32. The residue stream 27 from the first stage meets pipeline specifications. The permeate stream 33 from the second stage contains about 400 ppm hydrogen sulfide and the overall methane loss is about 1%.

Example 32

A process was designed to handle a 1,000 scfm gas stream containing 200 ppm hydrogen sulfide, 15 vol % carbon dioxide and the remainder methane, a composition that falls in Zone D of FIG. 1. The process uses a membrane separation system as shown in FIG. 7. Numerals 23, 26 and 32 indicate the three banks of membrane modules; 23 and 32 contain the more hydrogen-sulfide-selective membrane; 26 contains the more carbon-dioxide-selective membrane. The incoming gas stream 22 is at 1,000 psia and is mixed with the residue stream 34 from the second stage to form the feed gas stream 35 to the first membrane stage. The residue stream, 24, from the first bank of modules passes as feed to the second bank of the first stage, 26. As in Example 31, the permeate streams 25 and 28 could be combined before or after recompression, and a condenser to remove water vapor could be included. The characteristics of the two types of membrane were assumed to be as follows:

More hydrogen-sulfide-selective membrane:
Hydrogen sulfide/methane selectivity: 50
Carbon dioxide/methane selectivity: 13
Methane flux: $7.5 \times 10^{-6} \, cm^3(STP)/cm^2 \cdot s \cdot cmHg$ More carbon-dioxide-selective membrane:
Hydrogen sulfide/methane selectivity: 25
Carbon dioxide/methane selectivity: 20
Methane flux: $7.5 \times 10^{-6} \, cm^3(STP)/cm^2 \cdot s \cdot cmHg$ The compositions of the various streams were calculated and are given in Table 14.

TABLE 14

| Stream # | $CH_4$ conc. (vol %) | $H_2S$ conc. (ppm) | $CO_2$ conc. (vol %) |
|---|---|---|---|
| 22 | 85.0 | 200 | 15.0 |
| 35 | 64.0 | 200 | 36.0 |
| 24 | 68.0 | 130 | 32.0 |
| 27 | 98.0 | 4 | 2.0 |
| 25 | 13.2 | 1,443 | 86.7 |
| 28 | 26.7 | 294 | 73.3 |
| 31 | 25.2 | 427 | 74.8 |
| 33 | 3.0 | 1,447 | 97.0 |
| 34 | 29.9 | 200 | 70.1 |

The membrane areas required were as follows: 21 m² for membrane 23, 248 m² for membrane 26 and 17 m² for membrane 32. The residue stream 27 from the first stage meets pipeline specifications. The permeate stream 33 from the second stage contains about 1,500 ppm hydrogen sulfide and the overall methane loss is about 0.4%. The feed stream to the second stage bank of modules, 32, contains 427 ppm hydrogen sulfide and 75 vol % carbon dioxide, a composition that falls in the more carbon-dioxide-selective membrane zone of the zone diagram. However, since it is not required to meet pipeline specification for the residue stream from the second stage, an optimized design provides better hydrogen sulfide recovery if the more hydrogen-sulfide-selective membrane is used.

Example 33

A process was designed to handle a 1,000 scfm gas stream containing 1,000 ppm hydrogen sulfide, 15 vol % carbon dioxide and the remainder methane, a composition that falls in Zone D of FIG. 1, but close to the boundary of Zone B. The process uses a membrane separation system as shown in FIG. 7. Numerals 23, 26 and 32 indicate the three banks of membrane modules; 23 and 32 contain the more hydrogen-sulfide-selective membrane; 26 contains the more carbon-dioxide-selective membrane. The incoming gas stream 22 is at 1,000 psia and is mixed with the residue stream 34 from the second stage to form the feed gas stream 35 to the first membrane stage. The residue stream, 24, from the first bank of modules passes as feed to the second bank of the first stage, 26. As in Examples 31 and 32, the permeate streams 25 and 28 could be combined before or after recompression, and a condenser to remove water vapor could be included. The characteristics of the two types of membrane were assumed to be as follows:

| More hydrogen-sulfide-selective membrane: | |
|---|---|
| Hydrogen sulfide/methane selectivity: | 50 |
| Carbon dioxide/methane selectivity: | 13 |
| Methane flux: | 7.5 × 10⁻⁶ cm³(STP)/ cm²·s·cmHg |
| More carbon-dioxide-selective membrane: | |
| Hydrogen sulfide/methane selectivity: | 25 |
| Carbon dioxide/methane selectivity: | 20 |
| Methane flux: | 7.5 × 10⁻⁶ cm³(STP)/ cm²·s·cmHg |

The compositions of the various streams were calculated and are given in Table 15.

TABLE 15

| Stream # | CH₄ conc. (vol %) | H₂S conc. (ppm) | CO₂ conc. (vol %) |
|---|---|---|---|
| 22 | 84.9 | 1,000 | 15.0 |
| 35 | 63.9 | 1,000 | 36.0 |
| 24 | 79.7 | 70 | 20.3 |
| 27 | 98.0 | 4 | 2.0 |
| 25 | 17.0 | 3,770 | 82.7 |
| 28 | 37.4 | 221 | 62.6 |
| 31 | 26.6 | 2,084 | 73.2 |
| 33 | 3.1 | 7,390 | 96.2 |
| 34 | 31.5 | 1,000 | 68.4 |

The membrane areas required were as follows: 119 m² for membrane 23, 188 m² for membrane 26 and 17 m² for membrane 32. The residue stream 27 from the first stage meets pipeline specifications. The permeate stream 33 from the second stage contains about 0.7 vol % hydrogen sulfide and the overall methane loss is about 0.4%. As with Example 31, an optimized design uses the more hydrogen-sulfide-selective membrane for the second stage.

Example 34

A process was designed to handle a 1,000 scfm gas stream containing 100 ppm hydrogen sulfide, 4 vol % carbon dioxide and the remainder methane, a composition that falls in Zone B of FIG. 1, but so close to the boundary of Zone D that the composition is just within Zone D after mixing with the recycle stream from the second membrane stage. The process uses a membrane separation system as shown in FIG. 7. Numerals 23, 26 and 32 indicate the three banks of membrane modules; 23 and 32 contain the more hydrogen-sulfide-selective membrane; 26 contains the more carbon-dioxide-selective membrane. The incoming gas stream 22 is at 1,000 psia and is mixed with the residue stream 34 from the second stage to form the feed gas stream 35 to the first membrane stage. The residue stream, 24, from the first bank of modules passes as feed to the second bank of the first stage, 26. As in Examples 31-33, the permeate streams 25 and 28 could be combined before or after recompression, and a condenser to remove water vapor could be included. The characteristics of the two types of membrane were assumed to be as follows:

| More hydrogen-sulfide-selective membrane: | |
|---|---|
| Hydrogen sulfide/methane selectivity: | 50 |
| Carbon dioxide/methane selectivity: | 13 |
| Methane flux: | 7.5 × 10⁻⁶ cm³(STP)/ cm²·s·cmHg |
| More carbon-dioxide-selective membrane: | |
| Hydrogen sulfide/methane selectivity: | 25 |
| Carbon dioxide/methane selectivity: | 20 |
| Methane flux: | 7.5 × 10⁻⁶ cm³(STP)/ cm²·s·cmHg |

The compositions of the various streams were calculated and are given in Table 6.

TABLE 16

| Stream # | CH₄ conc. (vol %) | H₂S conc. (ppm) | CO₂ conc. (vol %) |
|---|---|---|---|
| 22 | 96.0 | 100 | 4.0 |
| 35 | 94.0 | 100 | 6.0 |
| 24 | 98.0 | 4 | 2.0 |
| 27 | 98.1 | 4 | 1.9 |
| 25 | 70.3 | 741 | 29.7 |
| 28 | 75.7 | 57 | 24.3 |
| 31 | 70.3 | 737 | 29.7 |
| 33 | 20.0 | 3,680 | 79.6 |
| 34 | 81.2 | 99 | 18.8 |

The membrane areas required were as follows: 131 m² for membrane 23, 1 m² for membrane 26 and 9 m² for membrane 32. The residue stream 27 from the first stage meets pipeline specifications. The permeate stream 33 from the second stage contains about 0.4 vol % hydrogen sulfide and the overall methane loss is about 0.5%.

SET 6

Examples 35-38 compare the performances of different types of membrane process for various feed gas compositions. The processes are not optimized, but are simply intended to highlight the difference between the respective performances.

Example 35

No carbon dioxide; moderate amounts of hydrogen sulfide

A one-stage membrane process was designed to handle a gas stream containing 100 ppm hydrogen sulfide, the remainder methane, at a feed pressure of 1,000 psia. The process schematic is as shown in FIG. 2, where numeral I indicates the bank of membrane modules, and the feed, residue and permeate streams are indicated by numerals 2, 3 and 4 respectively. The process was assumed to use one bank of more carbon-dioxide-selective membranes having the following characteristics:

| Hydrogen sulfide/methane selectivity: | 25 |
|---|---|
| Carbon dioxide/methane selectivity: | 20 |
| Methane flux: | 7.5 × 10⁻⁶ cm³(STP)/ cm²·s·cmHg |

The compositions and flow rates of the permeate and residue streams were calculated and are given in Table 17.

TABLE 17

| STREAM | FEED | RESIDUE | PERMEATE |
|---|---|---|---|
| Flow rate (scfm) | 1,000 | 833 | 167 |
| CH₄ conc. (vol %) | 99.99 | 99.99 | 99.94 |
| H₂S conc. (ppm) | 100 | 4 | 580 |

The membrane area used to perform such a separation was calculated to be about 200 m². The stage cut was 17% and the methane loss into the permeate was 17% also.

The process design calculation was repeated using more hydrogen-sulfide-selective membranes having the following characteristics:

| Hydrogen sulfide/methane selectivity: | 50 |
|---|---|
| Carbon dioxide/methane selectivity: | 13 |
| Methane flux: | 7.5 × 10⁻⁶ cm³(STP)/ cm² · s · cmHg |

The compositions and flow rates of the permeate and residue streams were calculated and are given in Table 18.

TABLE 18

| STREAM | FEED | RESIDUE | PERMEATE |
|---|---|---|---|
| Flow rate (scfm) | 1,000 | 892 | 108 |
| CH₄ conc. (vol %) | 99.99 | 99.99 | 99.91 |
| H₂S conc. (ppm) | 100 | 4 | 890 |

The membrane area used to perform such a separation was calculated to be about 130 m². The stage cut was 10.8% and the methane loss into the permeate was 10.8 % also.

Comparing the two calculations, the loss of methane into the permeate through the more hydrogen-sulfide-selective membrane is about ⅔ of that through the more carbon-dioxide-selective membrane. The permeate stream from the more hydrogen-sulfide-selective membrane is about ⅔ the volume and 1.5 times more concentrated than the permeate stream from the more carbon-dioxide-selective membrane, making further treatment much easier. The process with the more hydrogen-sulfide-selective membrane also uses less membrane area.

Example 36

Small amounts of carbon dioxide; moderate amounts of hydrogen sulfide

A one-stage membrane process was designed to handle a gas stream containing 100 ppm hydrogen sulfide, 4 vol % carbon dioxide and the remainder methane, at a feed pressure of 1,000 psia. The process schematic is as shown in FIG. 2, where numeral 1 indicates the bank of membrane modules, and the feed, residue and permeate streams are indicated by numerals 2, 3 and 4 respectively. The process was assumed to use one bank of more carbon-dioxide-selective membranes having the following characteristics:

| Hydrogen sulfide/methane selectivity: | 25 |
|---|---|
| Carbon dioxide/methane selectivity: | 20 |
| Methane flux: | 7.5 × 10⁻⁶ cm³(STP)/ cm² · s · cmHg |

The compositions and flow rates of the permeate and residue streams were calculated and are given in Table 19.

TABLE 19

| STREAM | FEED | RESIDUE | PERMEATE |
|---|---|---|---|
| Flow rate (scfm) | 1,000 | 807 | 193 |
| CH₄ conc. | 95.99 | 99.72 | 80.38 |

TABLE 19-continued

| STREAM | FEED | RESIDUE | PERMEATE |
|---|---|---|---|
| (vol %) | | | |
| CO₂ conc. (vol %) | 4.0 | 0.27 | 19.57 |
| H₂S conc. (ppm) | 100 | 4 | 502 |

The membrane area used to perform such a separation was calculated to be about 200 m². The stage cut was 19% and the methane loss into the permeate was 16%.

The process design calculation was repeated using more hydrogen-sulfide-selective membranes having the following characteristics:

| Hydrogen sulfide/methane selectivity: | 50 |
|---|---|
| Carbon dioxide/methane selectivity: | 13 |
| Methane flux: | 7.5 × 10⁻⁶ cm³(STP)/ cm² · s · cmHg |

The compositions and flow rates of the permeate and residue streams were calculated and are given in Table 20.

TABLE 20

| STREAM | FEED | RESIDUE | PERMEATE |
|---|---|---|---|
| Flow rate (scfm) | 1,000 | 876 | 124 |
| CH₄ conc. (vol %) | 95.99 | 98.62 | 77.34 |
| CO₂ conc. (vol %) | 4.0 | 1.38 | 22.58 |
| H₂S conc. (ppm) | 100 | 4 | 780 |

The membrane area used to perform such a separation was calculated to be about 120 m². The stage cut was 12% and the methane loss into the permeate was 10%. Comparing the two calculations, the methane losses, permeate concentration, permeate volume and membrane area are once again better with the more hydrogen-sulfide-selective sulfide-selective membrane. It should also be noted that the more carbon-dioxide-selective membrane, in order to bring the residue stream hydrogen sulfide concentration to 4 ppm, reduces the carbon dioxide concentration to the low level of 0.27 vol %, which means that the gas stream has been significantly overprocessed.

Example 37

Large amounts of carbon dioxide; moderate amounts of hydrogen sulfide A one-stage membrane process was designed to handle a gas stream containing 100 ppm hydrogen sulfide, 30 vol % carbon dioxide and the remainder methane, at a feed pressure of 1,000 psia. The process schematic is as shown in FIG. 2, where numeral 1 indicates the bank of membrane modules, and the feed, residue and permeate streams are indicated by numerals 2, 3 and 4 respectively. The process was assumed to use one bank of more carbon-dioxide-selective membranes having the following characteristics:

| Hydrogen sulfide/methane selectivity: | 25 |
|---|---|
| Carbon dioxide/methane selectivity: | 20 |
| Methane flux: | 7.5 × 10⁻⁶ cm³(STP)/ cm² · s · cmHg |

The compositions and flow rates of the permeate and residue streams were calculated and are given in Table 21.

TABLE 21

| STREAM | FEED | RESIDUE | PERMEATE |
|---|---|---|---|
| Flow rate (scfm) | 1,000 | 598 | 402 |
| $CH_4$ conc. (vol %) | 69.99 | 97.99 | 28.34 |
| $CO_2$ conc. (vol %) | 30.0 | 2.0 | 71.64 |
| $H_2S$ conc. (ppm) | 100 | 3 | 244 |

The membrane area used to perform such a separation was calculated to be about 150 m². The stage cut was 40% and the methane loss into the permeate was over 16%.

The process design calculation was repeated using more hydrogen-sulfide-selective membranes having the following characteristics:

| | |
|---|---|
| Hydrogen sulfide/methane selectivity: | 50 |
| Carbon dioxide/methane selectivity: | 13 |
| Methane flux: | $7.5 \times 10^{-6}$ cm³(STP)/cm²·s·cmHg |

The compositions and flow rates of the permeate and residue streams were calculated and are given in Table 22.

TABLE 22

| STREAM | FEED | RESIDUE | PERMEATE |
|---|---|---|---|
| Flow rate (scfm) | 1,000 | 541 | 459 |
| $CH_4$ conc. (vol %) | 69.99 | 98.0 | 37.0 |
| $CO_2$ conc. (vol %) | 30.0 | 2.0 | 62.97 |
| $H_2S$ conc. (ppm) | 100 | 4 | 218 |

The membrane area used to perform such a separation was calculated to be about 240 m². The stage cut was 46% and the methane loss into the permeate was 24%.

Comparing the two calculations, the methane losses are high in both cases, because the process was not optimized. In practise, a two-stage system should be used to reduce the methane loss and improve the permeate hydrogen sulfide concentration. It is clear, however, that the methane loss, permeate concentration, permeate volume and membrane area are all more favorable if the more carbon-dioxide-selective membrane is used.

Example 38

Moderate amounts of carbon dioxide; moderate amounts of hydrogen sulfide

A one-stage membrane process was designed to handle a gas stream containing 100 ppm hydrogen sulfide, 10 vol % carbon dioxide and the remainder methane, at a feed pressure of 1,000 psia. The target was to just meet pipeline specification of 2 vol % for carbon dioxide, without controlling the hydrogen sulfide concentration in the residue stream. The process schematic is as shown in FIG. 2, where numeral 1 indicates the bank of membrane modules, and the feed, residue and permeate streams are indicated by numerals 2, 3 and 4 respectively. The process was assumed to use one bank of more carbon-dioxide-selective membranes having the following characteristics:

| | |
|---|---|
| Hydrogen sulfide/methane selectivity: | 25 |
| Carbon dioxide/methane selectivity: | 20 |
| Methane flux: | $7.5 \times 10^{-6}$ cm³(STP)/cm²·s·cmHg |

The compositions and flow rates of the permeate and residue streams were calculated and are given in Table 23.

TABLE 23

| STREAM | FEED | RESIDUE | PERMEATE |
|---|---|---|---|
| Flow rate (scfm) | 1,000 | 828 | 172 |
| $CH_4$ conc. (vol %) | 89.99 | 97.99 | 51.41 |
| $CO_2$ conc. (vol %) | 10.0 | 2.0 | 48.54 |
| $H_2S$ conc. (ppm) | 100 | 14 | 516 |

As can be seen from the table, the residue stream, which still contains 14 ppm, does not meet pipeline specification for hydrogen sulfide.

The process design calculation was repeated using more hydrogen-sulfide-selective membranes having the following characteristics:

| | |
|---|---|
| Hydrogen sulfide/methane selectivity: | 50 |
| Carbon dioxide/methane selectivity: | 13 |
| Methane flux: | $7.5 \times 10^{-6}$ cm³(STP)/cm²·s·cmHg |

The compositions and flow rates of the permeate and residue streams were calculated and are given in Table 24.

TABLE 24

| STREAM | FEED | RESIDUE | PERMEATE |
|---|---|---|---|
| Flow rate (scfm) | 1,000 | 783 | 217 |
| $CH_4$ conc. (vol %) | 89.99 | 97.99 | 61.05 |
| $CO_2$ conc. (vol %) | 10.0 | 2.0 | 38.91 |
| $H_2S$ conc. (ppm) | 100 | <1 | 46 |

In this case, although the residue stream meets the 2 vol % carbon dioxide specification, the hydrogen sulfide content of the stream has been reduced to just below ppm. This overprocessing results in a high methane loss of 15%.

The two calculations were repeated, using the hydrogen sulfide specification of ppm as the target, but without controlling the carbon dioxide concentration in the residue stream. The results for the more carbon-dioxide-selective membrane are given in Table 25, and for the more hydrogen-sulfide-selective membrane are given in Table 26.

TABLE 25

| STREAM | FEED | RESIDUE | PERMEATE |
|---|---|---|---|
| Flow rate (scfm) | 1,000 | 764 | 236 |
| $CH_4$ conc. (vol %) | 89.99 | 99.28 | 59.90 |
| $CO_2$ conc. (vol %) | 10.0 | 0.72 | 48.05 |
| $H_2S$ conc. (ppm) | 100 | 4 | 411 |

TABLE 25-continued

| STREAM | FEED | RESIDUE | PERMEATE |
|---|---|---|---|
| (ppm) | | | |

As can be seen from the table, the residue stream, although it meets the 4 ppm hydogen sulfide specification, contains only 0.7 vol % carbon dioxide. This substantial overprocessing results in a high methane loss of 16%.

TABLE 26

| STREAM | FEED | RESIDUE | PERMEATE |
|---|---|---|---|
| Flow rate (scfm) | 1,000 | 850 | 150 |
| $CH_4$ conc. (vol %) | 89.99 | 96.20 | 54.84 |
| $CO_2$ conc. (vol %) | 10.0 | 3.8 | 45.1 |
| $H_2S$ conc. (ppm) | 100 | 4 | 643 |

In this case, the residue stream, which still contains nearly 4 vol % carbon dioxide, does not meet the pipeline specification for carbon dioxide.

Figure 6:
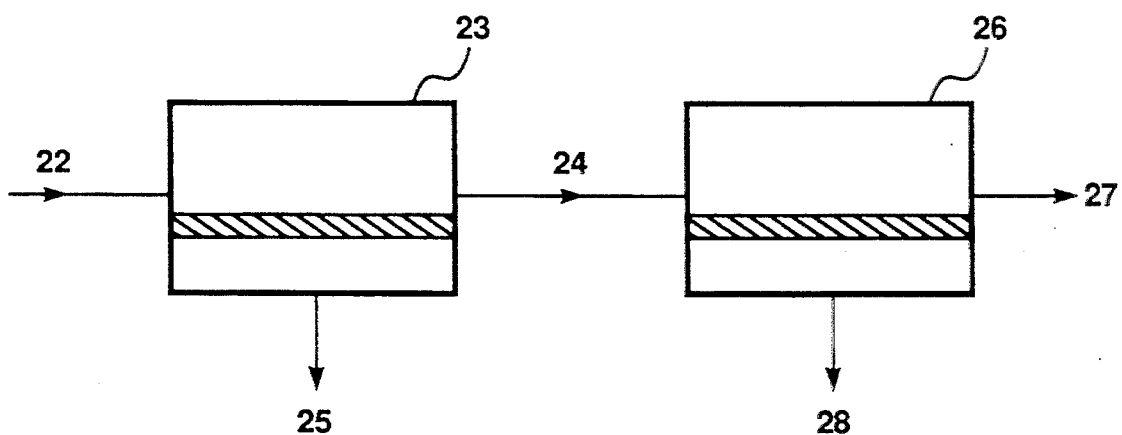
FIG. 6 is a basic schematic drawing of a two-step membrane separation process.

The calculations were repeated, using a combination process design as in FIG. 6, where numeral 23 indicates a more hydrogen-sulfide-selective bank of membrane modules and numeral 26 indicates a more carbon-dioxide-selective bank of membrane modules. The incoming gas stream 22 is at 1,000 psia. The residue stream 24 from the first bank of modules forms the feed to the second bank.

The more hydrogen-sulfide-selective membrane was assumed to have the following characteristics:

| | |
|---|---|
| Hydrogen sulfide/methane selectivity: | 50 |
| Water vapor/methane selectivity: | 1,000 |
| Carbon dioxide/methane selectivity: | 13 |
| Methane flux: | $7.5 \times 10^{-6}$ cm³(STP)/ cm²·s·cmHg |

The more carbon-dioxide-selective membrane was assumed to have the following characteristics:

| | |
|---|---|
| Carbon dioxide/methane selectivity: | 20 |
| Hydrogen sulfide/methane selectivity: | 25 |
| Water vapor/methane selectivity: | 200 |
| Methane flux: | $7.5 \times 10^{-6}$ cm³(STP)/ cm²·s·cmHg |

The compositions and flow rates of the permeate and residue streams from each bank of modules were calculated and are given in Table 27.

TABLE 27

| STREAM | FEED | RESIDUE | PERMEATE |
|---|---|---|---|
| FIRST MODULE BANK (more hydrogen-sulfide-selective membrane) | | | |
| Flow rate (scfm) | 1,000 | 900 | 99.7 |
| $CH_4$ conc. (vol %) | 89.99 | 94.38 | 50.35 |
| $CO_2$ conc. (vol %) | 10.0 | 5.62 | 49.57 |
| $H_2S$ conc. (ppm) | 100 | 14 | 876 |
| SECOND MODULE BANK (more carbon-dioxide-selective membrane) | | | |
| Flow rate (scfm) | 900 | 812 | 88.4 |
| $CH_4$ conc. (vol %) | 94.38 | 97.98 | 61.35 |

TABLE 27-continued

| STREAM | FEED | RESIDUE | PERMEATE |
|---|---|---|---|
| $CO_2$ conc. (vol %) | 5.62 | 2.01 | 38.65 |
| $H_2S$ conc. (ppm) | 14 | 4 | 106 |

The combination process performs better than either of the single membrane processes in this composition range. The total membrane area used is about 135 m². Residue stream 27 from the second stage meets pipeline specification. If the permeate streams 25 and 28 from the two banks of membrane modules are pooled, the permeate composition is 510 ppm hydrogen sulfide, 44 vol % carbon dioxide and 56 vol % methane. The methane loss in the pooled permeates is about 11.5%. This loss could be reduced if the process were optimized.

SET 7

Examples 39 and 40 show treatment processes in which the membrane process does not bring the gas stream to pipeline specification for all components.

Example 39

Membrane plus scavenging process

A process was designed to handle a gas stream containing 1,000 ppm hydrogen sulfide, 0.1 vol % water vapor, 4 vol % carbon dioxide and the remainder methane, at a feed pressure of 1,000 psia. The process includes a one-stage membrane separation step, followed by a scavenging step to bring the hydrogen sulfide concentration down further to 4 ppm. The scavenging step could be carried out using an iron sponge, for example. The process was assumed to use one bank of more hydrogen-sulfide-selective membranes having the following characteristics:

| | |
|---|---|
| Hydrogen sulfide/methane selectivity: | 80 |
| Water vapor/methane selectivity: | 1,000 |
| Carbon dioxide/methane selectivity: | 12 |
| Methane flux: | $1 \times 10^{-6}$ cm³(STP)/ cm²·s·cmHg |

The compositions and flow rates of the permeate and residue streams were calculated and are given in Table 28.

TABLE 28

| STREAM | FEED | RESIDUE | PERMEATE |
|---|---|---|---|
| Flow rate (scfm) | 100 | 90.3 | 9.7 |
| $CH_4$ conc. (vol %) | 95.8 | 98 | 74.9 |
| $CO_2$ conc. (vol %) | 4.0 | 1.9 | 23.1 |
| $H_2S$ conc. (ppm) | 1,000 | 40 | 990 |
| Water vapor conc. (vol %) | 0.1 | 2 ppm | 1.0 |

The membrane area used was calculated to be about 70 m². The stage cut was just under 10% and the methane loss into the permeate was 7.6%. The process produces a residue stream that meets pipeline specification for carbon dioxide and water vapor, but needs further polishing to remove hydrogen sulfide.

Example 40

Process including amine plant for hydrogen sulfide removal

A process was designed to handle a gas stream containing 0.5 vol % hydrogen sulfide, 20 vol % carbon dioxide and the remainder methane, at a feed pressure of 1,000 psia. The process uses a one-stage membrane separation step to carry out a first separation of carbon dioxide and hydrogen sulfide, followed by an amine plant to bring the stream to pipeline specification. The process was assumed to use one bank of more hydrogen-sulfide-selective membranes having the following characteristics:

| | |
|---|---|
| Hydrogen sulfide/methane selectivity: | 50 |
| Carbon dioxide/methane selectivity: | 13 |
| Methane flux: | $7.5 \times 10^{-6} \, cm^3(STP)/cm^2 \cdot s \cdot cmHg$ |

The compositions and flow rates of the permeate and residue streams were calculated and are given in Table 29.

TABLE 29

| STREAM | FEED | RESIDUE | PERMEATE |
|---|---|---|---|
| Flow rate (scfm) | 1,000 | 840 | 160 |
| $CH_4$ conc. (vol %) | 79.5 | 88.8 | 30 |
| $CO_2$ conc. (vol %) | 20 | 11.1 | 67 |
| $H_2S$ conc. (vol %) | 0.5 | 0.05 | 2.9 |

The membrane area used was calculated to be about 70 $m^2$. The stage cut was just under 16% and the methane loss into the permeate was 6%. The process produces a residue stream from which 90% of the hydrogen sulfide and about 50% of the carbon dioxide has been removed. This residue stream passes to the amine plant for additional treatment to bring it within specification for carbon dioxide and hydrogen sulfide.

We claim:

1. A membrane process for treating a gas stream comprising hydrogen sulfide, carbon dioxide and methane, said process comprising the following steps:
   (a) providing a feed stream containing carbon dioxide in a concentration less than about 3% to less than about 10% and hydrogen sulfide in a concentration more than about 10 ppm to more than about 300 ppm, with the lower end of the carbon dioxide range corresponding to the lower end of the hydrogen sulfide range (<3% carbon dioxide; >10 ppm hydrogen sulfide) and the upper end of the carbon dioxide range corresponding to the upper end of the hydrogen sulfide range (<10% carbon dioxide; >300 ppm hydrogen sulfide);
   (b) passing said feed stream through a membrane unit containing a membrane characterized by a selectivity for hydrogen sulfide over methane of at least 35 and a selectivity for carbon dioxide over methane of at least 12, said selectivity being measured with a mixed gas stream containing at least hydrogen sulfide, carbon dioxide and methane and at a feed pressure of at least 500 psig;
   (c) withdrawing from said membrane unit a residue stream containing carbon dioxide in a concentration no greater than about 3 vol % and hydrogen sulfide in a concentration no greater than about 20 ppm.

2. The process of claim 1, wherein said selectivity for hydrogen sulfide over methane is at least 40.

3. The process of claim 1, wherein said selectivity for hydrogen sulfide over methane is at least 50.

4. The process of claim 1, wherein said feed pressure at which said selectivity can be obtained is at least 1,000 psig.

5. The process of claim 1, wherein said residue stream contains carbon dioxide in a concentration no greater than about 2 vol %.

6. The process of claim 1, wherein said residue stream contains hydrogen sulfide in a concentration no greater than about 4 ppm.

7. The process of claim 1, wherein said membrane comprises a composite membrane having a selective layer comprising a polymer that is rubbery under the operating conditions of the process.

8. The process of claim 1, wherein said membrane comprises a composite membrane having a selective layer that has a water sorption greater than 5% upon immersion in liquid water.

9. The process of claim 1, wherein said membrane comprises a composite membrane having a selective layer that has a water sorption greater than 10% upon immersion in liquid water.

10. The process of claim 1, wherein said membrane comprises a block copolymer containing a polyether block.

11. The process of claim 1, wherein said membrane comprises a polyamide-polyether block copolymer having the general formula

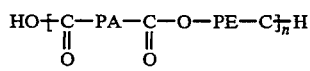

wherein PA is a polyamide group, PE is a polyether group and n is a positive integer.

12. The process of claim 1, wherein said feed stream comprises natural gas.

13. The process of claim 1, further comprising:
   (d) withdrawing from said membrane unit a permeate stream enriched in carbon dioxide and hydrogen sulfide and having a methane content such that methane loss from said feed stream is no more than about 5%.

14. The process of claim 13, wherein said methane loss is no more than about 2%.

15. The process of claim 1, further comprising:
   (d) withdrawing from said membrane unit a permeate stream sufficiently enriched in hydrogen sulfide to be treated in a sulfur-fixing process.

16. The process of claim 1, wherein said feed stream further comprises water vapor and has a relative humidity of at least 90%.

17. The process of claim 1, further comprising:
   (d) withdrawing from said membrane unit a permeate stream enriched in carbon dioxide and hydrogen sulfide;
   (e) passing said permeate stream through a second membrane unit;
   (f) withdrawing from said second membrane unit a second permeate stream enriched in carbon dioxide and hydrogen sulfide and depleted in methane compared with said permeate stream.

18. The process of claim 17, wherein said second permeate stream has a methane content such that methane loss from said feed stream is no more than about 5%.

19. The process of claim 18, wherein said methane loss is no more than about 2%.

20. The process of claim 17, further comprising:
(g) withdrawing from said second membrane unit a second residue stream depleted in carbon dioxide and hydrogen sulfide compared with said permeate stream; and
(h) recirculating said second residue stream for further treatment.

21. The process of claim 17, further comprising:
(g) withdrawing from said second membrane unit a second residue stream depleted in carbon dioxide and hydrogen sulfide compared with permeate stream; and
(h) passing said second residue stream to a gas pipeline.

22. The process of claim 1, further comprising:
(d) withdrawing from said membrane unit a permeate stream enriched in carbon dioxide and hydrogen sulfide;
(e) passing said permeate stream through a second membrane unit, thereby generating a second residue stream and a second permeate stream enriched in carbon dioxide and hydrogen sulfide and depleted in methane compared with said permeate stream;
(f) passing said second residue stream through a third membrane unit, thereby generating a third residue stream and a third permeate stream;
(g) returning said third permeate stream upstream of said second membrane unit for further processing in said second membrane unit.

23. The process of claim 22, wherein said second permeate stream has a methane content such that methane loss from said feed stream is no more than about 5%.

24. The process of claim 23, wherein said methane loss is no more than about 2%.

25. The process of claim 22, further comprising:
(h) recirculating said third residue stream for further treatment.

26. The process of claim 1 wherein said feed stream contains carbon dioxide, hydrogen sulfide and water vapor, all in concentrations above pipeline specification, and wherein said residue stream meets pipeline specifications for carbon dioxide, hydrogen sulfide and water vapor.

27. A membrane process for treating a gas stream comprising hydrogen sulfide, carbon dioxide and methane, said process comprising the following steps:
(a) providing a feed stream containing carbon dioxide in a concentration less than about 10% to less than about 20% and hydrogen sulfide in a concentration more than about 300 ppm to more than about 600 ppm, with the lower end of the carbon dioxide range corresponding to the lower end of the hydrogen sulfide range (<10% carbon dioxide; >300 ppm hydrogen sulfide) and the upper end of the carbon dioxide range corresponding to the upper end of the hydrogen sulfide range (<20% carbon dioxide; >600 ppm hydrogen sulfide);
(b) passing said feed stream through a membrane unit containing a membrane characterized by a selectivity for hydrogen sulfide over methane of at least 35 and a selectivity for carbon dioxide over methane of at least 12, said selectivity being measured with a mixed gas stream containing at least hydrogen sulfide, carbon dioxide and methane and at a feed pressure of at least 500 psig;
(c) withdrawing from said membrane unit a residue stream containing carbon dioxide in a concentration no greater than about 3 vol % and hydrogen sulfide in a concentration no greater than about 20 ppm.

28. The process of claim 27, wherein said selectivity for hydrogen sulfide over methane is at least 40.

29. The process of claim 27, wherein said selectivity for hydrogen sulfide over methane is at least 50.

30. The process of claim 27, wherein said feed pressure at which said selectivity can be obtained is at least 1,000 psig.

31. The process of claim 27, wherein said residue stream contains carbon dioxide in a concentration no greater than about 2 vol %.

32. The process of claim 27, wherein said residue stream contains hydrogen sulfide in a concentration no greater than about 4 ppm.

33. The process of claim 27, wherein said membrane comprises a composite membrane having a selective layer comprising a polymer that is rubbery under the operating conditions of the process.

34. The process of claim 27, wherein said membrane comprises a composite membrane having a selective layer that has a water sorption greater than 5% upon immersion in liquid water.

35. The process of claim 27, wherein said membrane comprises a composite membrane having a selective layer that has a water sorption greater than 10% upon immersion in liquid water.

36. The process of claim 27, wherein said membrane comprises a block copolymer containing a polyether block.

37. The process of claim 27, wherein said membrane comprises a polyamide-polyether block copolymer having the general formula $$HO\!\!-\!\!\left[\!\!\begin{array}{c}C\!-\!PA\!-\!C\!-\!O\!-\!PE\!-\!C\\ \| \quad\quad \| \\ O \quad\quad\quad O\end{array}\!\!\right]_{\!\!n}\!\!H$$

wherein PA is a polyamide group, PE is a polyether group and n is a positive integer.

38. The process of claim 27, wherein said feed stream comprises natural gas.

39. The process of claim 27, further comprising:
(d) withdrawing from said membrane unit a permeate stream enriched in carbon dioxide and hydrogen sulfide and having a methane content such that methane loss from said feed stream is no more than about 5%.

40. The process of claim 39, wherein said methane loss is no more than about 2%.

41. The process of claim 27, further comprising:
(d) withdrawing from said membrane unit a permeate stream sufficiently enriched in hydrogen sulfide to be treated in a sulfur-fixing process.

42. The process of claim 27, wherein said feed stream further comprises water vapor and has a relative humidity of at least 90%.

43. The process of claim 27, further comprising:

(d) withdrawing from said membrane unit a permeate stream enriched in carbon dioxide and hydrogen sulfide;

(e) passing said permeate stream through a second membrane unit;

(f) withdrawing from said second membrane unit a second permeate stream enriched in carbon dioxide and hydrogen sulfide and depleted in methane compared with said permeate stream.

44. The process of claim 43, wherein said second permeate stream has a methane content such that methane loss from said feed stream is no more than about 5%.

45. The process of claim 44, wherein said methane loss is no more than about 2%.

46. The process of claim 43, further comprising:

(g) withdrawing from said second membrane unit a second residue stream depleted in carbon dioxide and hydrogen sulfide compared with said permeate stream; and (h) recirculating said second residue stream for further treatment.

47. The process of claim 43, further comprising:

(g) withdrawing from said second membrane unit a second residue stream depleted in carbon dioxide and hydrogen sulfide compared with said permeate stream; and (h) passing said second residue stream to a gas pipeline.

48. The process of claim 27, further comprising:

(d) withdrawing from said membrane unit a permeate stream enriched in carbon dioxide and hydrogen sulfide;

(e) passing said permeate stream through a second membrane unit, thereby generating a second residue stream and a second permeate stream enriched in carbon dioxide and hydrogen sulfide and depleted in methane compared with said permeate stream;

(f) passing said second residue stream through a third membrane unit, thereby generating a third residue stream and a third permeate stream;

(g) returning said third permeate stream upstream of said second membrane unit for further processing in said second membrane unit.

49. The process of claim 48, wherein said second permeate stream has a methane content such that methane loss from said feed stream is no more than about 5%.

50. The process of claim 49, wherein said methane loss is no more than about 2%.

51. The process of claim 48, further comprising:

(h) recirculating said third residue stream for further treatment.

52. The process of claim 27, wherein said feed stream contains carbon dioxide, hydrogen sulfide and water vapor, all in concentrations above pipeline specification, and wherein said residue stream meets pipeline specifications for carbon dioxide, hydrogen sulfide and water vapor.

53. A membrane process for treating a gas stream comprising hydrogen sulfide, carbon dioxide and methane, said process comprising the following steps:

(a) providing a feed stream containing carbon dioxide in a concentration less than about 20% to less than about 40% and hydrogen sulfide in a concentration more than about 600 ppm to more than about 1%, with the lower end of the carbon dioxide range corresponding to the lower end of the hydrogen sulfide range (<20% carbon dioxide; >600 ppm hydrogen sulfide) and the upper end of the carbon dioxide range corresponding to the upper end of the hydrogen sulfide range (<40% carbon dioxide; >1% hydrogen sulfide);

(b) passing said feed stream through a membrane unit containing a membrane characterized by a selectivity for hydrogen sulfide over methane of at least 35 and a selectivity for carbon dioxide over methane of at least 12, said selectivity being measured with a mixed gas stream containing at least hydrogen sulfide, carbon dioxide and methane and at a feed pressure of at least 500 psig;

(c) withdrawing from said membrane unit a residue stream containing carbon dioxide in a concentration no greater than about 3 vol % and hydrogen sulfide in a concentration no greater than about 20 ppm.

54. The process of claim 53, wherein said selectivity for hydrogen sulfide over methane is at least 40.

55. The process of claim 53, wherein said selectivity for hydrogen sulfide over methane is at least 50.

56. The process of claim 53, wherein said feed pressure at which said selectivity can be obtained is at least 1,000 psig.

57. The process of claim 53, wherein said residue stream contains carbon dioxide in a concentration no greater than about 2 vol %.

58. The process of claim 53, wherein said residue stream contains hydrogen sulfide in a concentration no greater than about 4 ppm.

59. The process of claim 53, wherein said membrane comprises a composite membrane having a selective layer comprising a polymer that is rubbery under the operating conditions of the process.

60. The process of claim 53, wherein said membrane comprises a composite membrane having a selective layer that has a water sorption greater than 5% upon immersion in liquid water.

61. The process of claim 53, wherein said membrane comprises a composite membrane having a selective layer that has a water sorption greater than 10% upon immersion in liquid water.

62. The process of claim 53, wherein said membrane comprises a block copolymer containing a polyether block.

63. The process of claim 53, wherein said membrane comprises a polyamide-polyether block copolymer having the general formula

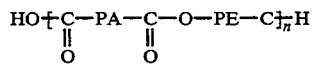

wherein PA is a polyamide group, PE is a polyether group and n is a positive integer.

64. The process of claim 53, wherein said feed stream comprises natural gas.

65. The process of claim 53, further comprising:

(d) withdrawing from said membrane unit a permeate stream enriched in carbon dioxide and hydrogen sulfide and having a methane content such that methane loss from said feed stream is no more than about 5%.

66. The process of claim 65, wherein said methane loss is no more than about 2%.

67. The process of claim 53, further comprising:

(d) withdrawing from said membrane unit a permeate stream sufficiently enriched in hydrogen sulfide to be treated in a sulfur-fixing process.

68. The process of claim 53, wherein said feed stream further comprises water vapor and has a relative humidity of at least 90%.

69. The process of claim 53, further comprising:
(d) withdrawing from said membrane unit a permeate stream enriched in carbon dioxide and hydrogen sulfide;
(e) passing said permeate stream through a second membrane unit;
(f) withdrawing from said second membrane unit a second permeate stream enriched in carbon dioxide and hydrogen sulfide and depleted in methane compared with said permeate stream.

70. The process of claim 69, wherein said second permeate stream has a methane content such that methane loss from said feed stream is no more than about 5%.

71. The process of claim 70, wherein said methane loss is no more than about 2%.

72. The process of claim 69, further comprising:
(g) withdrawing from said second membrane unit a second residue stream depleted in carbon dioxide and hydrogen sulfide compared with said permeate stream; and
(h) recirculating said second residue stream for further treatment.

73. The process of claim 69, further comprising:
(g) withdrawing from said second membrane unit a second residue stream depleted in carbon dioxide and hydrogen sulfide compared with said permeate stream; and
(h) passing said second residue stream to a gas pipeline.

74. The process of claim 53, further comprising:
(d) withdrawing from said membrane unit a permeate stream enriched in carbon dioxide and hydrogen sulfide;
(e) passing said permeate stream through a second membrane unit, thereby generating a second residue stream and a second permeate stream enriched in carbon dioxide and hydrogen sulfide and depleted in methane compared with said permeate stream;
(f) passing said second residue stream through a third membrane unit, thereby generating a third residue stream and a third permeate stream;
(g) returning said third permeate stream upstream of said second membrane unit for further processing in said second membrane unit.

75. The process of claim 74, wherein said second permeate stream has a methane content such that methane loss from said feed stream is no more than about 5%.

76. The process of claim 75, wherein said methane loss is no more than about 2%.

77. The process of claim 74, further comprising:
(h) recirculating said third residue stream for further treatment.

78. The process of claim 53, wherein said feed stream contains carbon dioxide, hydrogen sulfide and water vapor, all in concentrations above pipeline specification, and wherein said residue stream meets pipeline specifications for carbon dioxide, hydrogen sulfide and water vapor.

79. A membrane process for treating a gas stream comprising hydrogen sulfide, carbon dioxide and methane, said process comprising:
(a) providing a feed stream containing carbon dioxide, hydrogen sulfide and methane;
(b) passing said feed stream through two membrane units arranged in series so that a residue stream from one membrane unit forms a feed stream to the other membrane unit, one membrane unit containing a more hydrogen-sulfide-selective membrane characterized by a selectivity for hydrogen sulfide over methane of at least 35 and a selectivity for carbon dioxide over methane of at least 12, said selectivity being measured with a mixed gas stream containing at least hydrogen sulfide, carbon dioxide and methane and at a feed pressure of at least 500 psig, the other membrane unit containing a more carbon-dioxide-selective membrane characterized by a selectivity for carbon dioxide over methane of at least 20, said selectivity being measured with a mixed gas stream containing at least hydrogen sulfide, carbon dioxide and methane and at a feed pressure of at least 500 psig;
(c) withdrawing from whichever membrane unit is second in series a residue stream containing carbon dioxide in a concentration no greater than about 3 vol % and hydrogen sulfide in a concentration no greater than about 20 ppm.

80. The process of claim 79, wherein said feed stream passes first through the unit containing said more hydrogen-sulfide-selective membrane.

81. The process of claim 79, wherein said feed stream passes first through the unit containing said more carbon-dioxide-selective membrane.

82. The process of claim 79, wherein said feed stream contains carbon dioxide in a concentration of about 5–20 vol % and hydrogen sulfide in a concentration of about 20–1,000 ppm.

83. The process of claim 79, wherein said feed stream contains carbon dioxide in a concentration of about 10–25 vol % and hydrogen sulfide in a concentration of about 50–5,000 ppm.

84. The process of claim 79, wherein said feed stream contains carbon dioxide in a concentration above about 25 vol % and hydrogen sulfide in a concentration above about 200 ppm.

85. The process of claim 79, wherein said feed stream contains carbon dioxide in a concentration above about 40 vol % and hydrogen sulfide in a concentration above about 600 ppm.

86. The process of claim 79, wherein said more hydrogen-sulfide-selective membrane exhibits a selectivity for hydrogen sulfide over methane of at least 40.

87. The process of claim 79, wherein said more hydrogen-sulfide-selective membrane exhibits a selectivity for hydrogen sulfide over methane of at least 50.

88. The process of claim 79, wherein said feed pressure at which said selectivity for hydrogen sulfide over methane can be obtained is at least 1,000 psig.

89. The process of claim 79, wherein said residue stream contains carbon dioxide in a concentration no greater than about 2 vol %.

90. The process of claim 79, wherein said residue stream contains hydrogen sulfide in a concentration no greater than about 4 ppm.

91. The process of claim 79, wherein said two membrane units are arranged in series so that a permeate stream from one membrane unit forms a feed stream to the other membrane unit.

92. The process of claim 79, wherein said residue stream containing carbon dioxide in a concentration no greater than about 3 vol % and hydrogen sulfide in a concentration no greater than about 20 ppm is withdrawn from whichever membrane unit is first in series.

93. The process of claim 79, wherein said more hydrogen-sulfide-selective membrane comprises a composite membrane having a selective layer comprising a polymer that is rubbery under the operating conditions of the process.

94. The process of claim 79, wherein said more hydrogen-sulfide-selective membrane comprises a block copolymer containing a polyether block.

95. The process of claim 79, wherein said more hydrogen-sulfide-selective membrane comprises a polyamide-polyether block copolymer having the general formula

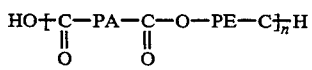

wherein PA is a polyamide group, PE is a polyether group and n is a positive integer.

96. The process of claim 79, further comprising:
(d) withdrawing from said two membrane units permeate streams enriched in carbon dioxide and hydrogen sulfide and having a total methane content such that total methane loss from said feed stream is no more than about 5%.

97. The process of claim 79, further comprising:
(d) withdrawing from said two membrane units permeate streams having a total hydrogen sulfide content sufficient to be treated in a sulfur-fixing process.

98. The process of claim 79, wherein said feed stream further comprises water vapor and has a relative humidity of at least 90%.

99. The process of claim 79, further comprising:
(d) withdrawing permeate streams from said two membrane units and combining them;
(e) passing a resulting combined permeate stream through a third membrane unit;
(f) withdrawing from said third membrane unit a third permeate stream enriched in carbon dioxide and hydrogen sulfide and depleted in methane compared with said permeate stream.

100. The process of claim 99, wherein said third permeate stream has a methane content such that methane loss from said feed stream is no more than about 5%.

101. The process of claim 100, wherein said methane loss is no more than about 2%.

102. The process of claim 100, wherein said third permeate stream is sufficiently enriched in hydrogen sulfide to be treated in a sulfur-fixing process.

103. The process of claim 79, wherein said feed stream contains carbon dioxide, hydrogen sulfide and water vapor, all in concentrations above pipeline specification, and wherein said residue stream meets pipeline specifications for carbon dioxide, hydrogen sulfide and water vapor.

* * * * *